(12) United States Patent
Warren et al.

(10) Patent No.: US 11,170,425 B2
(45) Date of Patent: Nov. 9, 2021

(54) METHODS OF AUGMENTING SEARCH ENGINES FOR ECOMMERCE INFORMATION RETRIEVAL

(71) Applicant: GroupBy Inc., Toronto (CA)

(72) Inventors: Will Warren, Toronto (CA); Roland Gossage, Toronto (CA)

(73) Assignee: BCE Inc., Verdun (CA)

( * ) Notice: Subject to any disclaimer, the term of this patent is extended or adjusted under 35 U.S.C. 154(b) by 921 days.

(21) Appl. No.: 14/639,461

(22) Filed: Mar. 5, 2015

(65) Prior Publication Data

US 2015/0310527 A1    Oct. 29, 2015

Related U.S. Application Data

(63) Continuation-in-part of application No. 14/227,998, filed on Mar. 27, 2014, now Pat. No. 9,672,552.

(51) Int. Cl.
*G06Q 30/06* (2012.01)
(52) U.S. Cl.
CPC ..... *G06Q 30/0625* (2013.01); *G06Q 30/0623* (2013.01)

(58) Field of Classification Search
CPC ......... G06F 17/30392; G06F 17/30424; G06F 17/3043; G06F 17/30448; G06F 17/3064;
(Continued)

(56) References Cited

U.S. PATENT DOCUMENTS 5,404,507 A * 4/1995 Bohm ............... G06F 17/30654
8,086,590 B2 * 12/2011 Zheng ................... G06Q 30/06 707/706

(Continued)

OTHER PUBLICATIONS

Anonymous, "Method and Apparatus for Mobile Information Retrieval on the Open Web," IP.com, No. IPCOM000203108D, Jan. 19, 2011, 6pp. (Year: 2011).*

*Primary Examiner* — Adam L Levine
(74) *Attorney, Agent, or Firm* — Gowling WLG (Canada) LLP

(57) ABSTRACT

A system for processing a query request on behalf of a user requesting product information, the system comprising: a computer processor for implementing instructions stored in storage to: receive the query request from the user over a communications network, the query including a query term; access product definitions associated with a master and variant record differentiated product database containing the product information for a particular product; compare the query term to the product definitions to determine whether the query term matches one or more master definitions of the product database or one or more variant definitions of the product database; augment the query request based on results of said matches to generate an augmented query request containing augmented query content; send the augmented query request to a search engine for searching against the product database; receive a query result from the search engine containing the product information in response to the augmented query request, the product information including either a representative image of a master record of the particular product from the product database or one or more representative images corresponding to one or more variant records of the particular product from the product database; and send the product information over the communications network to the user for subsequent presentation on a user interface of the user, the product information formatted as a response to the query request.

11 Claims, 7 Drawing Sheets

(58) Field of Classification Search
CPC .... G06F 17/30672; G06Q 30/06–0645; G06Q 30/08; G06Q 50/01
See application file for complete search history.

(56) References Cited

U.S. PATENT DOCUMENTS

| | | | |
|---|---|---|---|
| 2003/0171914 A1* | 9/2003 | Jung | G06F 17/30663 704/7 |
| 2008/0294622 A1* | 11/2008 | Kanigsberg | G06F 17/30672 |
| 2014/0188925 A1* | 7/2014 | Skolicki | H04N 21/4622 707/765 |

* cited by examiner

METHODS OF AUGMENTING SEARCH ENGINES FOR ECOMMERCE INFORMATION RETRIEVAL

FIELD

The present invention is related to item search and retrieval in eCommerce.

BACKGROUND

ECommerce is generally considered to be the sales aspect of e-business and needs well executed e-tailing or virtual storefronts, accessed by consumers (e.g. users, shoppers, etc.), provided by websites with online catalogs or product inventory. On-line or network access to a merchant's product inventory is typically done by consumers to directly buy goods or services from a seller over the network (e.g. Internet) using a web browser.

An online shop can facilitate business-to-consumer (B2C) and business-to-business (B2B) online shopping, depending upon the targeted user of the online shop. Traditional retail success has relied upon physical stores providing an enjoyable user experience that promotes and facilitates the user having efficient access to products for purchase. With the growth of online shopping, comes a wealth of new market footprint coverage opportunities for stores that can appropriately cater to offshore market demands and service requirements, however users still expect the ability to efficiently find online the products they are looking for amongst all of the various types and variations of products available. Like traditional physical stores, the ability of online stores to quickly and efficiently present users with user desired product selections and descriptions greatly enhances the online store's desired goal of converting user product interest into product sales.

One critical tool used by online shoppers to find a product of interest amongst the website of the retailer directly, or by searching among alternative vendors, is a shopping search engine interface. Only once a particular product has been found and selected on the website of the seller, can the user use a shopping cart to accumulate multiple items and to adjust quantities, with an associated "checkout" process. The access to and execution of the search engine by the online shop needs to handle the effects of information load, or overload, as the product information environment presented to the user via the search engine can provide additional product information such as comparative products and services, as well as various alternatives and attributes of each alternative (e.g. variants). This product information presented to the user by the search engine must describe products for sale with text, photos, and multimedia files that are considered relevant to the user in response to their product search query, otherwise the user may quickly lose interest in the online shop and may gravitate to another online shop with a better executed product information presentation experience.

Even more than in the physical store, its best for the merchant to consider online shopping as an opportunity for the shopper to purchase rather than an opportunity for the merchant to sell something. It's all about who is in the driving seat. It's so easy for the shopper to click away from a web page that is not of interest. The online store must make sure that it's easy for the purchaser to get the product information they're likely to want in response to their search queries, rather than purchaser deemed irrelevant, useless or wrong information such as pictures of products that are substantially visually different to the type of product desired by the purchaser (e.g. showing various pictures of different coloured pants other than red jeans in response to a user search for "red jeans"). People prefer to be in control so they should feel in control as they search and navigate around the online store website via their browser experience through the search engine of the online store. Accordingly, the online shopping experience (and return online experience) of the user, as facilitated via the browser through the website search engine, should provide the user with access to product information and merchant information (e.g. shipping, store location, etc.) that is perceived by the user as ease of use and presence of user-friendly features. In today's online world, the user desires access to product information that is considered easy, provides the ability to find what the user needs quickly, and provides the user the ability to finish up fast and save time.

Further, research has shown that many consumers will not buy from websites that they do not trust. What's more, site aesthetics, i.e. how good the web store looks, ease of desired product identification, and/or ease of site navigation, can be the most important factor(s) contributing to how shoppers judge the merchant's professionalism and trustworthiness. A disadvantage with current eCommerce websites is the presentation via inefficiently configured search engine interfaces that return endlessly pages of product grids that contain product items that are mostly irrelevant to the user search. Users desire a search engine configured with a means to sort and filter category pages and search results in order to return relevant search results to a user's search/navigation query submitted to the search engine.

SUMMARY

An object of the present invention is to provide an item search and retrieval method and system to obviate or mitigate at least one of the above-presented disadvantages.

A first aspect provided is a system for processing a query request on behalf of a user requesting product information, the system comprising: a computer processor for implementing instructions stored in storage to: receive the query request from the user over a communications network, the query including a query term; access product definitions associated with a master and variant record differentiated product database containing the product information for a particular product; compare the query term to the product definitions to determine whether the query term matches one or more master definitions of the product database or one or more variant definitions of the product database; augment the query request based on results of said matches to generate an augmented query request containing augmented query content; send the augmented query request to a search engine for searching against the product database; receive a query result from the search engine containing the product information in response to the augmented query request, the product information including either a representative image of a master record of the particular product from the product database or one or more representative images corresponding to one or more variant records of the particular product from the product database; and send the product information over the communications network to the user for subsequent presentation on a user interface of the user, the product information formatted as a response to the query request.

A second aspect provided is a search engine configured for processing a query request on behalf of a user requesting product information, the system comprising: a computer processor for implementing instructions stored in storage to:

receive the query request from the user over a communications network, the query including a query term; access product definitions associated with a master and variant record differentiated product database containing the product information for a particular product; compare the query term to the product definitions to determine whether the query term matches one or more master definitions of the product database or one or more variant definitions of the product database; augment the query request based on results of said matches to generate augmented query content; search against the product database using the augmented query content; generate a query result containing the product information in response to the augmented query content, the product information including either a representative image of a master record of the particular product from the product database or one or more representative images corresponding to one or more variant records of the particular product from the product database; and send the product information over the communications network to the user for subsequent presentation on a user interface of the user, the product information formatted as a response to the query request.

A third aspect provided is a method for processing a query request on behalf of a user requesting product information as stored instructions implemented by a computer processor, the method comprising the steps of: receiving the query request over a communications network, the query including a query term; accessing product definitions associated with a master and variant record differentiated product database containing the product information for a particular product; comparing the query term to the product definitions to determine whether the query term matches one or more master definitions of the product database or one or more variant definitions of the product database; augmenting the query request based on results of said matches to generate augmented query content; searching against the product database using the augmented query content; generating a query result containing the product information in response to the augmented query content, the product information including either a representative image of a master record of the particular product from the product database or one or more representative images corresponding to one or more variant records of the particular product from the product database; and sending the product information over the communications network to the user for subsequent presentation on a user interface of the user, the product information formatted as a response to the query request.

A fourth aspect provided is a method for processing a query request on behalf of a user requesting product information as stored instructions implemented by a computer processor, the method comprising the steps of: receiving the query request over a communications network, the query including a query term; searching using the query term against a master and variant record differentiated product database containing the product information for a particular product; generating a query result containing the product information in response to the query term; accessing product definitions associated with the product database; comparing the query term to the product definitions to determine whether the query term matches one or more master definitions of the product database or one or more variant definitions of the product database; augmenting the query result based on results of said matches to generate augmented query result content by selecting for inclusion in the product information either a representative image of a master record of the particular product from the product database or one or more representative images corresponding to one or more variant records of the particular product from the product database; and sending the product information over the communications network for use in subsequent presentation on a user interface of the user.

BRIEF DESCRIPTION OF THE DRAWINGS

The foregoing and other aspects will be more readily appreciated having reference to the drawings, wherein.

DETAILED DESCRIPTION

Figure 1:
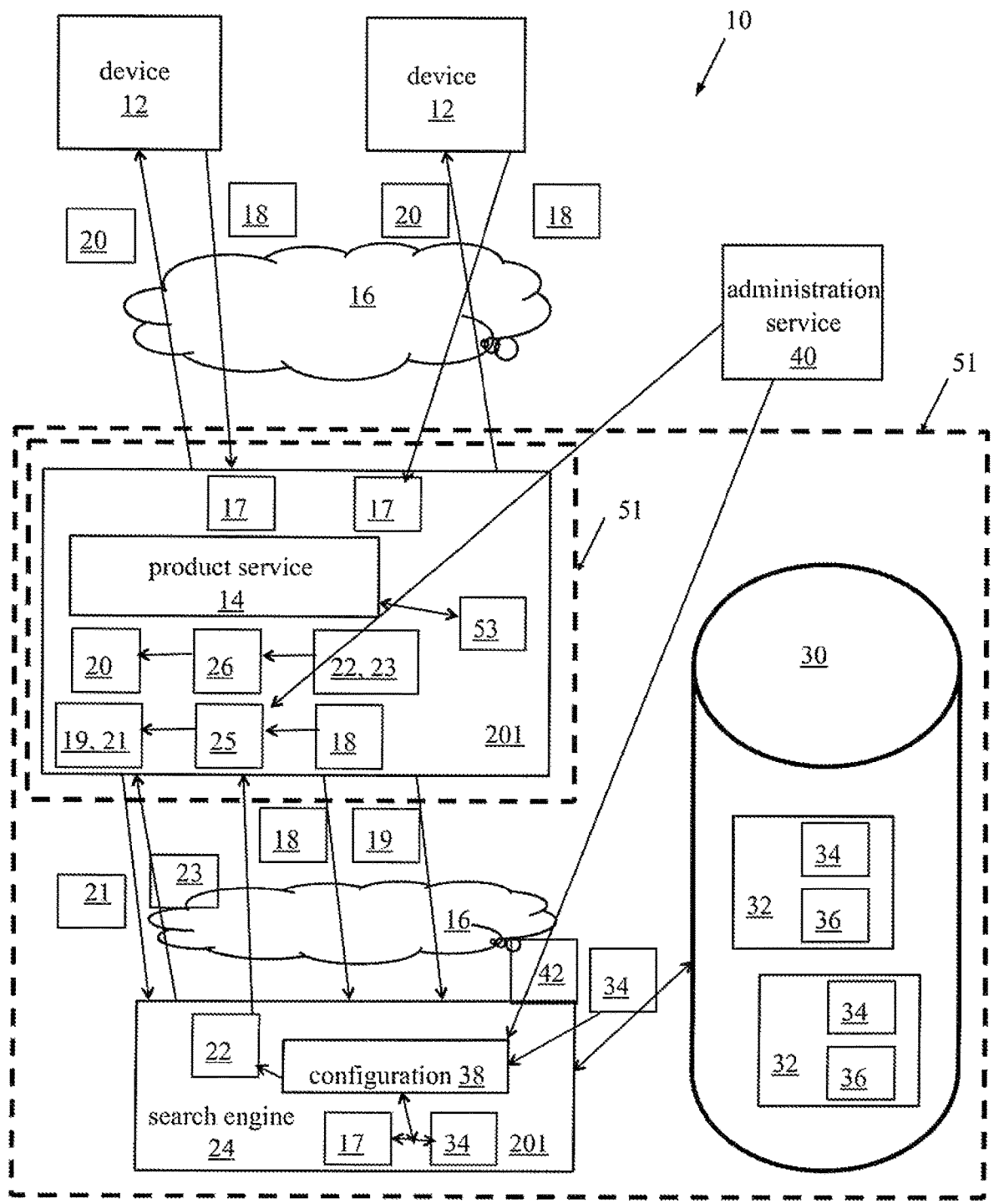
FIG. 1 is a view of a network system for facilitating item retrieval.

Referring to FIG. 1, shown is an item search retrieval system 10 including a plurality of network devices 12 coupled to a product service 14 (e.g. hosted on a server 201) via a communications network 16. The product service 14 receives product based query requests 18 (including search text) from the network devices 12 and sends appropriately configured query responses 20 back to the network device(s) 12, based on product information 22 received from a search engine 24, for display on a user interface 104 of the device 12. The search engine 24 obtains the product information 22 from object records 32 in the form of a product index stored in storage 30, based on a comparison for relevancy of the queries against the records of the product index. For example, the product information 22 stored in the product index (e.g. records 32) can be product master records (e.g. labelled shirt with generic shirt description and picture/image) and/or product variant records (e.g. labelled blue shirt, red shirt, size 6 shirt, polo shirt, short sleeve shirt with specific variant related description and specific variant relevant picture/image) as further described below. The product service 14 can forward the query request 18 to the search engine 24 (e.g. via the communications network 16). The product service 14 can format/reformat the product information 22 obtained from the search engine 24 based on one or more predefined formats 26 (e.g. based on rules, etc.), configured for presentation of the product information 22 on a user interface 104 (see FIG. 4) of the network device(s) 12 as the query response 20.

It is recognised that the product service 14 and/or the search engine 24 is/are deciding what the relevant product records 32 (e.g. master, variant, etc.) are in response to a comparison of the query request 18 content to the metadata and/or data content associated with each of the product records 32, as well as selection or filtering of any product information 22 to be included in the query response. For example, if the query request 18 content is determined to better (e.g. exceed a specified matching/relevancy threshold) match to a master record 32 over a variant record 32, then the relevant product definitions containing both words or phrases or terms (e.g. descriptive metadata) 34 and at least one representative image 36 representative of a respective product defined by the descriptive metadata 34 for the master record 32 is selected for inclusion in the product information 22 returned in the query response 20. Alternatively, if the query request 18 content is determined to better (e.g. exceed a specified matching/relevancy threshold) match to one or more variant records 32 over a master record 32, then the relevant product definitions containing both words or phrases or terms (e.g. descriptive metadata) 34 and at least one representative image 36 representative of a respective product defined by the descriptive metadata 34 for the one or more variant records 32 is selected for inclusion in the product information 22 returned in the query response 20.

This distinction between appropriate master record 32 or variant record(s) 32 is important to note, as representative images 36 of a master record 32 may vary quite significantly over corresponding image(s) 36 of the variant record(s) 32. For example, if the user submits a query request 18 for a red pair of jeans, the user would expect to see images 36 of red versus any other colour jeans. In this context, the term "red" would be used to return the variant record(s) 32 having red jean images 36 rather than the master record 32 having a generic "blue" jean image 36. This distinction becomes even more important for further variant descriptive terms in the query request 18 content, such as skinny red jeans, which would necessitate the selection of variant records 32 (including representative images 36) satisfying both the red and skinny variants, which would make the inclusion of a master record 32 containing a generic image 36 of a "standard cut" "blue" jean that much more confusing to the user upon viewing the returned product information 22 of the query result 20. As such, it is recognised that the defined distinction between master and different variant records 32 in the product storage 30, and the ability of the product service 14 and/or search engine 24 being able to distinguish between the different records 32 based on comparison of the query request 18 content (e.g. contained search terms and/or phrases) facilitates the selection of the most relevant records 32 and subsequent generation of the most appropriate query response 20 for sending to the user (e.g. to the user interface 104 of the device 12).

The item search retrieval system 10 facilitates the application of the queries 18 (or modified/augmented versions as further described below) by the search engine 24 (e.g. Elastic Search, Google Search Appliance, and other readily available search engines) to provide meaningful content (e.g. product information 22) for the purpose of supporting eCommerce websites (those in contact with or otherwise facilitating operation of the network devices 12 generating the queries 18) by having the meaningful content returned in the query response 20 to include representative master record 32 or variant record(s) 32 as determined by the product service 14 and/or search engine 24. For example, the product service 14 and/or the search engine 24 could determine that no variant product records 32 are relevant to the query response 18 and therefore instead return the appropriate master record 32 matching the query response 18. The rationale of the decision to return only the master records 32 content (e.g. representative image 36 and detailed description(s) 34) is important as the image 36 of the master record 32 will represent a generic representative version of the product image. Alternatively, the product service 14 and/or the search engine 24 could determine that no master product records 32 are relevant to the query response 18 and therefore instead return the appropriate variant record(s) 32 matching the query response 18. The rationale of the decision to return only the variant record(s) 32 content (e.g. representative image 36 and detailed description(s) 34) is important as the image 36 of the variant record(s) 32 will represent a specific (customized to the particular variant details of the product) representative version of the product image. It is recognised that determination of the appropriate master record 32 or alternative variant record(s) 32 is based on a comparison of the query response 18 content (e.g. included terms and/or phrases) with the terms and/or phrases contained in the data definitions (also referred to as metadata definitions) associated with each of the master records 32 and variant records 32 contained in the product storage 30.

These methods implemented by the product service 14, the search engine 24, and/or the product service 14 in combination with the search engine 24) provide for intelligent generation of a set of queries (e.g. one or more queries) based on the original query 18 received from the network device 12, the set of queries including one or more generated augmented queries 19,21 that are relevant to the searchable content stored in the product index as records 32 in the storage 30 accessible to the search engine 24. As further described below, the product service 14 intercepts the queries 18 and, based on comparison of the query 18 against one or more rules 25 (e.g. stored in a storage such as a database accessible to the product service 14), can also determine if the query 18 should be either directed against the search engine 24 or optionally should be redirected away from the search engine 24 (i.e. not applied against the product index) and instead the product service 14 can return to the network device 12 (as the product information 22) other dynamic or static content (e.g. information other than master and/or variant record data) stored outside/external to the product search index stored in the storage 30.

It is also recognised that the product service 14 can modify search text contained in the query request 18 in order to generate a modified query request 19 (i.e. containing modified search text) that is forwarded to the search engine 24, as further described below, before the query request 19 is sent to the search engine 24, e.g. the search query 18 is not sent to the search engine 24 and instead the product service 14 modifies the search query 18 to produce the modified search query 19 which is then sent to the search engine 24, based on rules 25 available to the product service 14. It is recognised that the rules 25 contain knowledge of specific terms and phrases contained in the product information stored in the product index (e.g. records 32) of the storage 30. Accordingly when the product service obtains the query 18, the product service 14 analyzes the query 18 content (e.g. search term(s), search phrase(s), navigation term(s), navigation phrase(s)) against those (e.g. search term(s), search phrase(s), navigation term(s), navigation phrase(s)) contained in the rules 25 and/or product records 32, and when the query 18 content matches any of the rules 25 and/or product records 32, then the product service 14 modifies the query 18 content to generate augmented query 19,21 content (for subsequent consumption by the search engine 14) and/or optionally redirects the original query 18 away from the search engine entirely (e.g. the query 18,19, 21 is applied against content external to the product index). It is recognised that the query 18,19,21 content contains term(s)/phrase(s) relevant to the product text/description and/or metadata defining the products in the master and variant records 32 represented by the product index stored in the storage 30. The product service 14 via the rules 25 can identify relevant query 18,19,21 content (and/or irrelevant query 18,19,21 content) to the product information 22 contained in the product index and augment the query 18 content to generate the augmented query 19,21 content accordingly (i.e. as defined by augmentation methods of the rules 25 matching selected query 18 content). Alternatively, the product service 14 can decide to send the included terms/phrases of the query content as is (without modification) to the search engine 24 for comparison against the product storage 30 content (e.g. search term(s), search phrase(s), navigation term(s), navigation phrase(s)) of the various product records 32.

Further, if the product information 22 returned from the search engine 24 is optionally determined (e.g. based on comparison to thresholds (e.g. rules 25) such as but not limited to a minimum number of records to return, maximum number of records to return, minimum number of categories to return, and/or maximum number of categories to return, etc.), by optionally comparing the content of the product information 22 to predefined thresholds or other content rules, the product service 14 could optionally decide to generate a further augmented query request and resubmit as an augmented query 21 in order to obtain a revised set of product information 23 before processing as a query response 20 for sending back to the network device 12. In other words, the network device 12 can send an initial search query 18 to the product service 14, however the product service will send query 18,19 and resend additional queries 21 to the search engine 24 before deciding to use the product information 22 received from the search engine 24 (in response to the lastly submitted search query 21) to process and then pass back to the network device 12 as the query response 20. In this manner, the product service 14 can act as an intermediary between the network device 12 and the search engine 24.

Search engines 24 can be defined as programs (i.e. a set of computer processor executed instructions) that searches documents (e.g. contained in the product index) for specified keyword(s) (in the query 18,19) and returns (i.e. product information 22 for use in the query response 20) a list of the documents in which where the keyword(s) were found. The search engine 24 can be thought of as a general class of programs that facilitate users to search for product information 22 on the network 16.

The search engine 24 can be configured to work by sending out a spider to fetch/identify as many documents (records 32) as possible. Another program of the search engine 24, called an indexer, then reads these documents and creates the product index based on the words/phrases contained in each document. Each search engine 24 can use a proprietary algorithm that is augmented by the configuration data 38 in conjunction with the product service 14, in order to create the indices such that, ideally, only meaningful results are returned for each query 19,21. The search results 23 returned by the search engine 24 in response to the query 19 can be presented in a line of results often referred to as search engine results pages (SERPs). The information can be a specialist in web pages, images, information and other types of files, as interpreted by the product service 14 via rules 25, 26 and then served up to the user as query response(s) 20. Some search engines 24 can also mine data available in databases or open directories. Unlike web directories, which can be maintained only by human editors, search engines 24 can also maintain real-time information by running an algorithm on a web crawler in order to keep the product index current in the storage 30. In one example, the search engine 24 can work by storing information about many web pages containing the product information 22 in the product index, which they retrieve from the HTML markup of the pages (e.g. as provided by the configuration data 38—i.e. template files). These pages can be retrieved by a crawler (sometimes also known as a spider), such as an automated crawler which follows every link of the product information 22 in the storage 30, for example related to product details as well as navigation details between the product details.

The search engine 24 can also analyze the contents of each page (or collection of text such as a document) to determine how it should be indexed (for example, words can be extracted from the titles, page content, headings, or special fields called meta tags). Indexing of the product information 22 in the product storage 30 can be organized in a master and variant data structure 50 (see FIG. 2), whereby a general product category 52 has a master record 32 with master relevant descriptive material 54 (e.g. generic representative image 36 and descriptive data 34) for the master record version and a plurality of variant records 32 with individually relevant descriptive material 56 (e.g. generic representative image 36 and descriptive data 34) for each of the variant record versions. As provided by example in FIG. 2, each of the records 32 associated with a particular product category 52 represents either a master record 32 or a variant record 32. In the case of variant records 32, each of the variants represents a particular variant feature 58 (e.g. colour such as red, green, etc.—style such as regular, boot cut, skinny, etc.) or set of variant features 58 that each have a representative image 36 providing an appropriate pictorial representation of the variant feature or set of variant features 58 of the variant record 32. For example, a unique skinny red jeans picture can be associated with the variant of "red", "skinny" jeans while a regular blue jeans picture can be associated with either a regular blue jeans variant record 32 or a boot cut blue jeans variant record 32 since any substantive visual distinction between boot cut styles and regular styles for jeans is difficult to perceive by the user on the user interface 104. However, it would be immediately apparent to the user in the case where a picture of a red pair of jeans is returned for display in response to a search for a different coloured (e.g. brown) pair of jeans.

Data about product information 22 is stored in the product index database 30 for use in later queries 19,21 processing. When the query 19,21 is received by the search engine 24 (typically by using keywords), the engine 24 examines its index and provides a listing of best-matching master or variant versioned web pages (e.g. product information content 22) according to its configuration data 38, for example with a short summary containing the document's title and sometimes parts of the text as well as a representative product image. The index is built by the search engine 24 from the product information 22 stored with the data and the method by which the product information 22 is indexed according to the configuration data 38. It is recognised that the product index can also be referred to as a structured directory of topics.

Elastic search is another example of a search engine 24 for querying written words contained in the product information 22 organized by the Elastic search product index. Elastic search can perform tasks, such as wading through text, returning text similar to a given query 19,21 and/or statistical analyses of a corpus of text. More specifically, Eastic search can be considered as a standalone database server, written in Java, that takes data (product information 22) in and stores it in a sophisticated format for the master and variant data structure 50 (as defined by the configuration data 38) optimized for language based searches. As such, Elastic search can search the database 30 of retail products by description, finding similar text in a body of crawled web pages, or searching through posts on a blog, or other formats of the product information 22. Elastic search configured search engine 24 can pertain to the actual algorithms (i.e. set of computer processor implemented instructions) for matching text and storing optimized indexes of searchable terms in the master and variant data structure 50.

In conjunction with the search engine 24, the product service 14 can use the rule set 25 to account for spell checking, synonyms, cross promotion of products based on identified search text within the query request 18, etc, in optionally augmenting the query request 18 to generate the modified query request 19. As such, the product service 14 can be exemplified as a proxy or bridge component positioned between the network devices 12 and the search engine 24, such that the product service 14 interacts with the search engine 24 on behalf of the network device 12. An example of the query request 18 of the network device 12 is a request for product information by a consumer from a merchant website 51 (shown by example in different ghosted view versions) making products available for sale in an ecommerce enterprise. As such, the query responses 20 could include pricing and optionally other purchase information (e.g. shipping details, payment instructions, etc.) of products detailed in the query responses 20. As further described below, the rules 25,26 can be configured and sent to the product service 14, for subsequent use in processing search queries 18 and product information 22, by an administration service 40. It is recognised that the network device 12 can be operated by a user wishing to access a merchant (e.g. ecommerce website 51) expressed by the product service 14.

Alternatively, the network device 12 can be operated by the ecommerce website that is in communication with the user (e.g. online shopper) wishing to access the merchant (e.g. ecommerce website), and as such the network device 12 forwards the query 18 on behalf of the user to the product service 14. In this example, it is the ecommerce website expressed by the network device 12 that is a intermediary between the product service 14 and online shoppers (not shown) accessing the ecommerce website in order to generate the search/navigation queries 18.

Further, the product service 14 can be considered as the client of the search engine 24, which is acting as the server of the network device 12 in their client-server relationship. Similarly, the network device 12 can be considered as the client of the product service 14 acting as the server in their client-server relationship. Similarly, the search engine 24 can be acting as the server with the product service 14 as the client in their client-server relationship. It is recognised that the physical server device 201 of the product service 14 can be the same or different physical server device 201 of the search engine 24. In this manner, the system 10 includes a number of differentiated client and server roles in the ecommerce application for product information request and retrieval. For example, the client-server model of the system 10 can be defined as a distributed application structure that partitions tasks or workloads between the providers of a resource or service (e.g. query response 20, product information 22,23), called servers, and service requesters (e.g. query request 18,19,21 product information 22,23), called clients. The clients and servers can communicate over the computer network 16 on separate hardware, but both client and server can reside in the same system. A server host (e.g. computer device 201) can run one or more server programs which share their resources with clients. Also, the client can be defined as one that does not share any of its resources, but requests the server's content or service function (e.g. query response 20, product information 22,23). Clients therefore initiate communication sessions with servers which await incoming requests (e.g. query request 18,19,21 product information 22,23). The client-server characteristic can describe the relationship of cooperating programs in the ecommerce application. The server component can provide a function or service to one or many clients, which initiate requests for such services. As such, it is recognised that whether a computer device 12,201 is a client, a server, or both, is determined by the nature of the application that requires the service functions.

For example, a single computer device 12,201 can run web server and file server software at the same time to serve different data to clients making different kinds of requests. Client software can also communicate with server software within the same computer device 12,201. Communication between servers, such as to synchronize data, is sometimes called inter-server or server-to-server communication. Client-host and server-host can be defined differently than client and server. The host can be any computer device 12,201 connected to the network 16. Whereas the words server and client may refer either to a computer device 12,201 or to the client/server computer program.

In view of the cooperation between the product service 14 and the search engine 24, it is recognised that that the system 10 provides the ecommerce environment in which the network device 12 cannot always submit an unaltered query request 18 for receipt by the search engine 24 and the network device 12 cannot always receive an unaltered query response 20 from the search engine 24, as the product service 14 is interposed between the network device 12 and the search engine 24. Therefore, the product service 14 can be defined as a bridge (or proxy) that sits in front of the search engine 24 and intercepts search queries 18 (e.g. potentially modifies them as search queries 19 using rule data 25) and can optionally augment the search results 22 received from the search engine 24 with any format data 26 that are applicable in order to generate the query response 20. As mentioned above, the product service 14 can execute multiple search queries 18,19,21 in serial succession before deciding to process (e.g. via rules 25) the received product information 22, in response to one of the serially executed queries 18,19,21 (e.g. the last query in the series), and send back to the network device 12 as the query response 20. This can also be referred to as an one/initial search query 18 received by the product service 14 to a many search query 18,19,21 submitted to the search engine 24 by the product service 14 in response to receipt of the one initial search query 18 (i.e. a one to many example). An advantage of the product service 14 configured to execute multiple search queries 18,19,21 in a sequential series to the search engine 24, based on only a common query 18 originally received from the network device 12, is that bandwidth savings and increased response time can be realized by the ecommerce system 10 while at the same time providing for a better ecommerce user experience (of the network device 12). This better ecommerce user experience can be reflected in the user perceiving more relevant search results 20 returned to the user, as compared to waiting for the user to respond to each query response 20 (sent by the product service 14 to the network device 12) before sending another search query 21 (by the product service 14) to the search engine 24 without receipt beforehand of a different search query 18 from the network device 12.

The product service 14 can also receive a query 18 and decide not to send the query 18 to the search engine 24 and instead satisfy the query 18 itself using relevant product information 22 already in possession of the product service 14 (e.g. in local storage) that is now external to the product index (e.g. records 32). An example of the using product information 22 external to the search index is for navigation (e.g. the query 18 is a navigation query) of product information already received from the search engine 24 and stored in a local cache of the product service 14. A further example is where the product service 14 determines, via comparison of the query 18 contents against the rule set 25, that the query 18 can be satisfied using product information 22 external to the product index 32 (e.g. store location information, store hours, credit card or payment information, shipping information, etc.).

Referring again to FIG. 1, the search engine 24 is coupled to the storage 30 (e.g. database) containing a series of object records 32 representing various product definitions containing both words or phrases or terms (e.g. descriptive metadata) 34 and at least one representative image 36 representative of a respective product defined by the descriptive metadata 34. In other words each object record 32 has both descriptive metadata 34 of a particular product as well as a product image 36 representative of the descriptive metadata 34, in particular including a master record 32 and a number of variant records 32 of the product contained in different or combined object records 32 as further described below (see FIG. 2). For example, the object record 32 can represent a pair of blue jeans, such that the descriptive metadata 34 can contain descriptors for "jeans", pricing, specified colour(s) such as red or black, specified size(s), specified style(s) such as boot cut or skinny, specified in stock status, etc. Also included in the object record 32 would be a representative image 36 of the blue jeans as the product. For example, the object record 32 for a red pair of blue jeans would have a picture 36 of a red coloured jeans, an object record 32 for a pair of boot cut jeans can have an image 36 of a standard dark blue jeans image of a boot cut style. As such, it is recognised that systematic searching through the object records 32 by the search engine 24 provides for item/product search and retrieval in a variant product space as represented in the master and variant differentiated data structure 50. It is recognised that the storage 30 can be considered local as part of the website 51 hosted on one or more servers 201, and/or the storage 30 can be considered remote from the website 51 and hosted on one or more remote servers (not shown) accessible over the network 16.

In terms of the storage 30, the records 32 can be represented by a table of all the data feeds (containing data 34,36) as uploaded by the merchant (e.g. via the administration service 40) and processed by the search engine 32 with their status. For example, a status of Complete can mean that the data 34,36 has been ingested by the search engine 24, stored in the master and variant differentiated data structure 50 of the storage 30 and can also mean that the data 34,36 has been organized as a series of records 32 that have been added to the index in the master and variant differentiated data structure 50 and ready to be searched by the search engine 24. A way for the administration service 40 to check that the uploaded data 34,36 is in the search index associated with the search engine 24 and the storage 30 is to test query for something specific in the newly uploaded data 34,36 now represented as searchable and indexed records 32.

It is recognised that a master record 32 can be defined as representing a generic version of a product, e.g. having metadata description 34 and an image 36 that is the "default" form of the product the master record 32 represents. For example, when the product comes in multiple colors or styles, these combinations can be considered of the type 'variant'. As such, master records 32 exist in a "master" sub-collection as categorized in the complete dataset of records 32 stored in the storage 30 as accessible and searchable by the search engine 24, based on the search text or modified search text of the search query 18,19,21 received from the product service 14. Further, a variant record 32 (typically multiple records 32 for a particular product that has only one master record 32) can be considered as the children of the 'master' records 32. The variant records 32 represent the various different combinations of attributes that are possible of their master record 32, such as the blue version of a shirt that comes in many colors (each of the colours will be a variant record 32 with its own metadata descriptors 34 and representative image 36 while the master record 32 will have a generic metadata description 34 of the product and a generic image 36 of the product. This variant record 32 will be placed in the "variant" sub-collection as categorized in the complete dataset of records 32 stored in the storage 30 as accessible and searchable by the search engine 24, based on the search text or modified search text of the search query 18,19,21 received from the product service 14.

A further type of record 32 can be a unique record type that has no children and no master, as the unique record 32 only comes in one form (e.g. there is only one version of the product). This unique record 32 can be placed in both the "master" and "variant" sub-collections as categorized in the complete dataset of records 32 stored in the storage 30 as accessible and searchable by the search engine 24, based on the search text or modified search text of the search query 18,19,21 received from the product service 14.

It is also recognised that the various variant records 32 of the master and variant differentiated data structure 50 can be placed in variant groups (either directly in the master and variant differentiated data structure 50 or as a result of filtering of product information 22 results obtained from the search engine 24), such that each of the various variant parameter combinations that are represented in an associated representative image 36 are shown (or otherwise understood to be represented by) in the representative image 36 coupled to the variant group. For example, all jean variants for different sizes could be grouped together according to style and colour, such that each size variant (e.g. small, medium, large) having the same colour and style would be grouped together as represented by the same red jeans representative image 36.

As such, the search engine 24 searches the object records 32 of the storage 30 using the search text (or modified search text), hereafter referred to generically as search data 17, of the search query 18,19 and compares the search data 17 to the descriptive metadata 34 of the various object records 32 in order to determine the product data 23 matching the search data 17. Based on the search results product data, the search engine 24 uses configuration data 38 (e.g. containing biasing logic, dynamic navigation logic, etc. pertinent to providing relevant search results to the user) to assist in ranking the product data to produce the resultant product information 22, which contains a ranked order of multiple search hits from the storage 30 including paired text 34 and image 36 data from each of the matching object records 32.

Also included in the system 10 is the administration service 40 used to generate the configuration data 38 to incorporate ecommerce related functionality to the searching algorithm of the search engine 24 including ecommerce related functionality such as but not limited to: dynamic navigation; biasing; as well as spell corrections specific to the descriptive metadata 34 of the products and synonyms specific to the descriptive metadata 34 of the products. The administration service 40 can also be used to generate the rule data 25,26 used by the product service 14. As such, the configuration data 38 of the search engine 24 is used to modify operation of the search engine 24 by adjusting the ranking algorithm, dynamic navigation, biasing, and any other functional operations that affect the content of the product information 22 for ecommerce purposes (e.g. provides content useful to the user of the network device 12 such that the query response 20 includes product information 22 deemed relevant to the user based on their intended product information desired as expressed by their search text submitted in the query request 18 by the network device 12.

Figure 2:
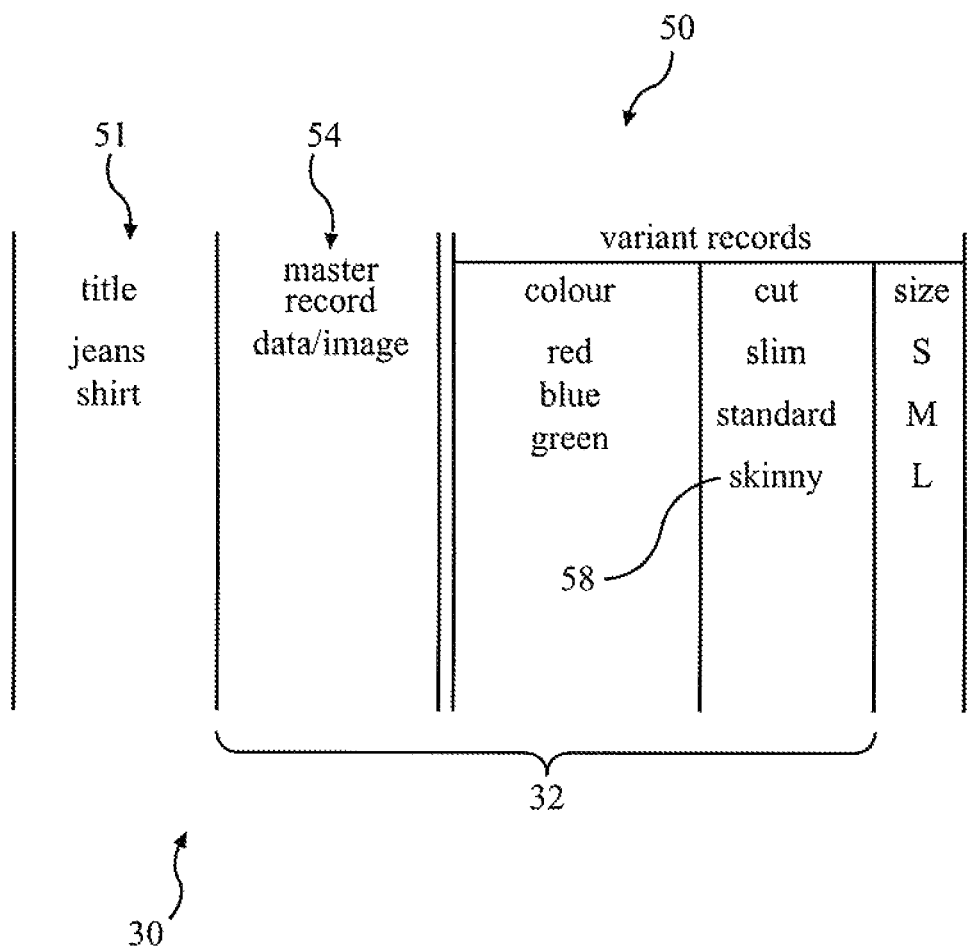
FIG. 2 is an example master and variant data structure for product information of the system of FIG. 1.

Referring to FIG. 1, multiple object records 32 (representing the product index) are stored in the storage 30 in order to represent multiple product lines available for selection and purchase via the product service 14 as separate products in the master and variant differentiated data structure (see FIG. 2). However, product variants are also incorporated into the product records 32 as individual sizes, colours, patterns, type, etc. as variations that those individual products come in, where each product variant can have its own SKU (Stock Keeping Unit) number. Accordingly, a variant product record 32 details different combinations of something like size, colour or weight of a product. Within a variant, one can further have options (e.g. large, medium, small or red, green, blue), referred to as variant options. Further, when a product has more than one variant (e.g. size and colour), then the query request 18 can include search text to choose an option from each variant (e.g. a large t-shirt in red), thus creating a variant combination that can also be stored as one or more object records 32. As such, each variant combination can be associated with its own unique SKU, which can have its own price and stock level, and can have its own description 34 and photo(s) 36. As such, the description 34 and photo(s) 36 for each product record 32 are used in the ecommerce application of the system 10 to define what variants the products have, how many options each variant has, and how many variant combinations these variants create.

Further, the records 32 can be organized in terms of different product categories (e.g. a child's coat can belong to both a defined "children's clothing" category as well as a "coat" category. The definition of these various categories can also be included in the description 34 of the product records 32, in order to facilitate the navigation and search in the online store (i.e. how customers find your products) represented by the contents of the storage 30 as retrieved by the search engine 24 and augmented/filtered/served to the network device 12 ultimately by the product service 14. For example, products can be organised into groups of categories, such as shoes, shirts, trousers, socks and shorts. In some cases, these top-level categories can be broken down into subcategories, e.g. shirts might have subcategories of T-Shirts, business shirts and casual Shirts. It may even be that you can break these subcategories down further. T-Shirts might break down into long sleeved and short sleeved. As such, all of this product category information can be contained in the description 34 and thus used as a potential for matching against the search text of the query requests 18,19,21.

Referring again to FIG. 1, the configuration data 38 can be used to incorporate ecommerce related functionality to the searching algorithm of the search engine 24 including ecommerce related functionality such as but not limited to: dynamic navigation; biasing; as well as spell corrections specific to the descriptive metadata 34 of the products and synonyms specific to the descriptive metadata 34 of the products. For example, the configuration data 38 can be expressed as configuration files that are utilized by the search engine 24 to implement the search related functionality (e.g. dynamic navigation, biasing, spell corrections, synonyms, etc.).

An example of the configuration data 38 as files is when the search engine 24 is embodied as a Google Search Appliance 24 (GSA 24). In essence, the system 10 built as an ecommerce application leveraging operation of the GSA 24 by extracting away from the GSA's traditional admin console. The administration service 40 is used to take only the parts of the GSA 24 configuration that are useful for ecommerce, and provide for replacement as modified in the form of the configuration files 38, since while the GSA 24 does provide an admin API to provide for some configuration of the system, there are certain aspects that are used for the ecommerce application of the system 10 that are not accessible through the admin API. These certain aspects include, but are not limited to: biasing (used for ordering the results to assist in maximizing conversion and average product order size—measured by dollar amount or product volume); front ends (used to name-space one configuration from another); language modification (should the website be expressed in one or more different languages such as in German, English, and/or French, etc.); metadata expansion policies (defining how the search results are expanded); and/or dynamic navigation (configuring the way in which result sets 20 can be filtered by the end user of the network device 12).

An example upload of the ecommerce enabled configuration files 38 for the GSA 24 can be as follows: 1) since list of ecommerce relevant functionality is not exposed through the admin API expressed by the GSA, the administration service 40 connects to the GSA 24 using the admin API 42 and downloads the existing full set of configuration files, 2) the administration service 40 modifies the parts of the GSA configuration that correspond to the ecommerce related functionality provided above by example, and 3) the administration service 40 re-uploads the now ecommerce enabled configuration file 38 to the GSA 24 for subsequent use in matching the search text 17 to the description 34 of the object records 32.

For example, a basic configuration file 38 can be roughly 10,000 lines long and include many different formats. The format was reverse engineered by downloading a blank configuration file, making a change in the GSA admin console, re-downloading the configuration file and doing a line by line difference.

Example

Here is an example of how you modify biasing profiles.
Before, with no biasing profiles:
    <scoring_additional_policies><![CDATA[
    { }
    ]]></scoring_additional_policies>
    <scoring_adjust><![CDATA[
    None -continued

| Example |
|---|

```
            ]]></scoring_adjust>
            <scoring_config><![CDATA[
            policyinformation {
              policy_name: "0"
              policy_type: BASE
            }
            ]]></scoring_config>
After, when biasing has been added:
        <scoring_additional_policies><![CDATA[
            {'bestbuydemo1Production_aoeu':         {'clickboost':         ['100',
'/export/hda3/7.0.14/local/conf/clickboost.data'],        'datebias':        ['0'],
'metadata':                                                                  ['80',
'something%3awith%3aa%3acolon%3aor_two%2e%2eello%3e%3c%3d%2daoeu:the%20
value%20has%20%60AOEU%40%23%24%25',    '0'],    'patterns':        ['0']),
'bestbuydemo1Production_margin_bias':           {'clickboost':         ['100',
'/export/hda3/7.0.14/local/conf/clickboost.data'],        'datebias':        ['0']),
'metadata': ['60', 'margin:high', '3', 'margin:medium', '2'], 'patterns':
['0']}, 'bestbuydemo1Production_sales_rank_bias':  {'clickboost':   ['100',
'/export/hda3/7.0.14/local/conf/clickboost.data'],        'datebias':        ['0'],
'metadata':        ['70',        'salesRankLongTerm:strong',                 '3',
'salesRankLongTerm:medium',   '2'],   'patterns':    ['0']}}
            ]]></scoring_additional_policies>
            <scoring_adjust><![CDATA[
            None
            ]]></scoring_adjust>
            <scoring_config><![CDATA[
            policyinformation {
              policy_name: "0"
              policy_type: BASE
            }
            policyinformation {
              policy_name: "a__bestbuydemo1Production_aoeu"
              policy_type: RESCORER
              metadata_information {
                policy_importance {
                  factor: 5
                  weight: 0.8
                }
                metadata {
                  name_and_content:
"something%3awith%3aa%3acolon%3aor_two%2e%2eello%3e%3c%2d%2daoeu:the%20
value%20has%20%60AOEU%40%23%24%25"
                  strength: 0
                }
              }
              clickboost_information {
                policy_importance {
                  factor: 2
                  weight: 1.0
                }
                file: "/export/hda3/7.0.14/local/conf/clickboost.data"
              }
            }
            policyinformation {
              policy_name: "a__bestbuydemo1Production_margin_bias"
              policy_type: RESCORER
              metadata_information {
                policy_importance {
                  factor: 5
                  weight: 0.6
                }
                metadata {
                  name_and_content: "margin:high"
                  strength: 3
                }
                metadata {
                  name_and_content: "margin:medium"
                  strength: 2
                }
              }
              clickboost_information {
                policy_importance {
                  factor: 2
                  weight: 1.0
                }
                file: "/export/hda3/7.0.14/local/conf/clickboost.data"
              }
            }
```

| Example |
|---|
| ```
    }
    policyinformation {
      policy_name: "a__bestbuydemo1Production_sales_rank_bias"
      policy_type: RESCORER
      metadata_information {
        policy_importance {
          factor: 5
          weight: 0.7
        }
        metadata {
          name_and_content: "salesRankLongTerm:strong"
          strength: 3
        }
        metadata {
          name_and_content: "salesRankLongTerm:medium"
          strength: 2
        }
      }
      clickboost_information {
        policy_importance {
          factor: 2
          weight: 1.0
        }
        file: "/export/hda3/7.0.14/local/conf/clickboost.data"
      }
    }
  ]]></scoring_config>
``` |

Further examples of configuration data 38 can include:

1) template: The template used to generate the GSA 24 content element in the GSA 24 feed (e.g. records 32). This template can be a fair representation of the product detail page, as this is used by the GSA 24 to determine relevance. The same kind of SEO can be applied to this template. For example, the template can be used to match predefined metadata (e.g. HTML tags) to specified content of the product records 32, for example a title tag to a product title (e.g. shirt) and a body tag to a product description of the shirt. The template can be applied by the administration service 40 during upload of the product information 22 to the storage 30 as embodied in the product index of the master and variant differentiated data structure 50 (see FIG. 2).

2) categoryFile: If this variable is set, the category file is loaded, and used to apply a taxonomy to the GSA data records 32. Because the GSA 24 can be a flat navigation, the categoryfile can creates sub category levels for each level in the taxonomy of the master and variant differentiated data structure 50 (see FIG. 2). For example, categoryLevel1, categoryLevel2 etc.;

3) sortField: If numeric data is contained in the feed that is wanted to be sortable, this ability is specified in this field;

4) variantFields: If any item in the data records 32 can have multiple variations of the master and variant differentiated data structure 50 (see FIG. 2), such as different colors, they may be desired to be returned directly, rather than as a generic master record 32. Although the variant records 32 are provided during their upload to the GSA 24, also the ability to specify which fields differentiate the variant record 32 from its master record 32. This configuration data 38 can provide for the return in the product information 22 as a mixture of variant and master records 32 without overlap, facilitating more accurate results for providing a more desirable user search experience of the product data contained in the storage 24 as accessed by the network device 12 indirectly via the product service 14 rather than submitting the search queries 18 directly to the search engine 24.

As discussed above, variant records 32 facilitate the inclusion of records that represent real world product variations. For example, a shirt with multiple sizes and colors could be split up into the different variant record 32 combinations of color and size in the master and variant differentiated data structure 50 (see FIG. 2). This means that a search 18 for "small green shirt" could actually return the record 32 with the color green (as detailed in the image 36 and/or metadata 34) and the size small (as detailed in the metadata 34) returned in the product information 22, as compared to the return of a generic master record 32 that would contain an image 36 of a non-green shirt and metadata 34 without terminology related to size small as desired by the user in view of the search text submitted in their search query 18. In other words, the user could become frustrated with search and/or navigation of the website 51 of the merchant if their search query 18 was for "small green shirt" and the query response 20 contained a product record 32 containing metadata description 34 for "large" and an image 36 of a blue shirt. As discussed, to handle variant queries 18 by the search engine 24 and/or the product service 14 in interpretation of the product information 22 before sending back the query response 20, two sub-collections can be made as stored in the product records 32 in the storage 30 of the master and variant differentiated data structure 50 (see FIG. 2). The default sub-collection (e.g. group) can be given a name specified in the record's 3 url attribute. This sub-collection can hold all 'master' and 'unique' records 32 of the master and variant differentiated data structure 50 (see FIG. 2). A second sub-collection can be made with the same name followed by '-Variants' of the master and variant differentiated data structure 50 (see FIG. 2). This can be used to hold all 'variant' records 32 and 'unique' records 32. Therefore, when the query 18 is received by the product service 14, looked for in the search text are variant values, such as the color blue, and, if found, can cause a switch to the "variant" sub-collection of records 32 as 1) requested by the product service 14 (in modifying the search query 18 as search query 19 to include the variant category designation)

and/or 2) filter the returned product information 22 received from the search engine 24 to remove any search result content records 32 pertain to non-variant (e.g. master record 32) data before forwarding on the product information 22 processed into the query response 20.

For example, to provide this functionality, the system 10 can be configured to specify which fields should be used for variant generation of the master and variant differentiated data structure 50 (see FIG. 2) with the variantFields configuration item. Further, the variant records 32 should be contained in your .CSV or .GCSXML file (content records 32) when uploading to the search engine 23 for indexing/search and storage in the storage 30. For example, to differentiate different types of records, one can use the attribute". The different values for this field can be used, such that if this field I not included in a record 32 then it can be treated as having the record type 'master'. As such, the search engine 24 could be directed by the configuration data 38 and/or by query terms inserted into the modified query 19 by the product service 14 in order to force the search engine to search only in the variant records 32, the master records 32, and/or the unique records 32. In this manner, the product service 14 can help optimize the amount of searching performed by the search engine in the master and variant differentiated data structure 50 (see FIG. 2) by pre-identifying what type of record 32 could be intended by the terms/phrases included in the query request 18. This initial record type determination (e.g. master type, variant type, unique type) could be performed by the product service 14 by comparing the terms/phrases included in the query request 18 with a collection 53 of product metadata definitions representing the metadata definitions in the storage 30. It is recognised that the collection 53 can be separate or part of the rules 25,26, as desired. Further, the product service 14 may have direct access to the collection 53 stored in the storage 30, as desired. Alternatively, the record type determination (e.g. master type, variant type, unique type) could be performed by the product service 14 once the product information 22 is returned by the search engine 24 by comparing the terms/phrases included in the product information 22 with a collection 53 of product metadata definitions representing the metadata definitions in the storage 30.

A further type of configuration data 38 is biasing, which can influence the product information 38 returned based on factors like how new a SKU is, whether a user is logged-onto the website 51, and/or whether they are a new or returning user. The use of biasing configuration data 38 by the search engine 24 when evaluating the product records 32 content matching against the search text of the search query 18,19, 21 can facilitate boosting exposure of products to the user in the content of the query results 20 by vendor, category, margin, and any other product attribute defined in the biasing profile. Biasing profiles of the configuration data 38 can contain the following elements, by example: Biasing Profile Name—the name assigned to the biasing profile containing letters, numbers, and/or underscores; Influence Slider—the amount of influence or bias the profile will have on search results (search records 32 accessed by the search engine 24 in the storage 30) based on a predefined value in a range (e.g. from 1-100); Define Bias—the names and content of meta properties to influence the results (e.g returned product information 22 to contain or exclude certain product records 32 either matching or not matching the meta properties). An option can be provided to leave this bias unchanged, or to select the strength of the bias' influence. For example, the biasing profile could match certain terms/phrases of the query request 18 and then restrict the subsequent search by the search engine 24 (e.g. via the modified query 19) by instructing the search engine to search only specific variant records 32 or unique records 32 that are considered part of the biasing profile for those terms/phrases. As such, the biasing profile could also be represented in the rules 25,26 used by the product service 14.

A further type of configuration data 38 as metadata used by the search engine 24 refine search results is Dynamic Navigation. For example, when a user (of the network device 12 as presented on the user interface 104) clicks on an attribute value contained in the query search results 20, the search results can be filtered to contain results from the original search query 18 that also have that specific attribute value. The options can be refreshed with the attribute values that are applicable to the new result set, for example. Users can also select multiple attributes and can easily back out of their selections to navigate the result set, and quickly locate the results they are looking for. For example, a search for laptops can offer attribute values of price range, as well as computer brands, online availability, and in-store pickup as part of the dynamic navigation. Dynamic Navigation can contain one or more of the following elements: Property Name—the exact match of a record's property name to make a dynamic navigation entry form; Display Name—this can be created exactly as you'd like it displayed to your customers/users; Type—e.g. types of dynamic navigation states such as but not limited to currency, date, float, integer, string, range currency, range data, range integer, and/or range float; Sort—the order that the dynamic navigation values will occur. They can be sorted four ways, including count ascending, count descending, value ascending, and/or value descending; Metadata—additional information about the dynamic navigation in the form of key-value pairs; Additional Options—additional options and capabilities for the dynamic navigation; Dynamic Navigation Enable OR Queries—enabling this allows users to select more than one option from the dynamic navigation. For example, a customer/user can refine the search for "blue" or "red" colored jeans instead of just "blue" jeans. For example, range typed navigations (range currency, range data, range integer, and range float) may not currently support OR queries.

The product service 14 can represent the interface of the network device 12 to the search engine 24. This product service 14 intercepts queries 18 before they are sent to the search engine 24 (e.g. GSA), and can optionally apply rules 25, and other added value processes, before sending the query 18,19 to the search engine 24 for matching against the product records 32 in the storage 30 for searching the master and variant differentiated data structure 50, as indexed. Then the search engine 24 can send results as product information 22 back with the augmented pieces. The product service 14 can have one or more search methods (as facilitated by rules 25,26) which can be used to facilitate search queries 18 (applied against the search engine 24 to obtain search results as product information 22 for processing and generation as response query 20), and guided navigation search queries. The search methods take a Query object 18 which represents the users current search and navigation state. It is recognised that for navigation (e.g. once the search results 20 are returned to the network device 12) of the content obtained from the product records 32, the product service 14 could process the navigation query 18 from the network device 12 and reprocess the product information 22 still in the memory of the product service 14 to respond with a subsequent response query 20 to the navigation query 18 without requesting for additional product information 22 from the search engine 24 in order to satisfy the navigation query 18.

In other words, once the product information 22 is returned to the product service 14, the product service 14 can use this content to satisfy subsequent navigation queries 18 received from the network device 12 without asking for additional product information 22 from the search engine 24 (based on additional navigation queries 18 being send to the search engine 24 by the product service 14). Alternatively, the product service 14 could ask for additional product information 22 from the search engine 24 in order to augment product information 22 previously received from the search engine 24 in order to satisfy the navigation query 18 of the network device 12.

In terms of the search queries 18, the product service 14 could receive a search query of the following form from the network device 12:
Query query=new Query( );
query.addField("*");
query.addValueRefinement("department", "COMPUTERS");
query.addRangeRefinement("regularPrice", "40.000000", "60.000000");
query.setSearchString("speakers");

Then the product service 14 could fire (e.g. send) the query 18,19 to the search engine 24, e.g. results=BridgeFactory.getBridge( ).search(query). Upon receiving the product information 22 from the search engine 24, the product service 14 (e.g. The Results object com.gbi.gsa.model.Results returned from BridgeFactory.getBridge( ).search(query)), this can contain content needed to render a search result and/or landing page as the content of the response query 20 sent back to the network device 12 by the product service 14. For example, this can be a plain object with getter methods to obtain.

It is also recognised that the network device 12 can submit navigation queries 18 based on the content received in the response query 20. For example, available Navigation as an array of objects (com.gbi.gsa.model.Navigation) representing refinements that can be made by the product service 14 using rules 25,26 to further drill-down on the current set of returned records 32.

It is recognized that the rules 25,26 can be created by a business user of the administration service 40 that utilizes page templates and controls when and where record content is surfaced. These rules 25,26 can be triggered from both search and navigation states (e.g. a result of receiving a search query 18 or a navigation query 18 from the network device 12) as well as events such as having no results. A rule can contain one or more of the following elements, by example: Name—The name assigned the particular rule. An example might be "PS3 Upsell"; Triggers—a trigger is a search and navigation state definition of the query 18 that triggers a rule because they determine where a rule will fire. The trigger types can be used to give the ability/flexibility to the system 10 to cross-sell and/or upsell (i.e. add into the search results 20,22 those content records 32 that would not have been matched strictly by the original search text 17 provided in the query 18 sent by the network device 12) at intersections of data that is supported by the content and categorization of the product records 32 in the storage 30 as accessed by the search engine 24 in the master and variant differentiated data structure 50. To add a trigger, one can chose from trigger types such as but not limited to: 1) Search—A search state that triggers a rule. For example, if a user searches for "PS3", you may want to have that search trigger a rule that takes the user to a rich landing page with a banner featuring a new game for the PlayStation 3, and upsells of related PS3 products on the side, such as headphones, or game controllers or other specified record styles (e.g. master, variant, unique). The search box takes a comma separated list of values that can all trigger the rule; 2) Navigation—This rule can be triggered during a navigation state. For example, if a user navigates by $200-400, then a you might want this rule to fire; 3) No Results Event—In the event an item is misspelled, for example, and no results are shown, you can have a rule in place to redirect a user to another page to assist them in their search; 4) No Navigation Event—In an event where there is no dynamic navigation on the left hand side, you may want to use this additional retail space as an opportunity to upsell; 5) Custom URL Parameter—provides you to fire a rule based on any piece of information that it can pass rules through the rule engine of the product service 14. For example, if you know that a user is signed in, and is a high net worth client, then they can make this rule fire exclusively for high net worth clients. This trigger can provide you to do anything you'd like above and beyond the normal operations of the search engine 24 in searching the master and variant differentiated data structure 50.

Further rules 25,26 can be used to modify the product information 22 received and now it is used to generate the content of the results query 20 and/or can be used to modify the search query 18 to produce the modified query 19,21. One rule type provides for aspect(s) of the query 18 to be rewritten by the product service 14 before a search request 19,21 is made to the search engine 23 for searching the master and variant differentiated data structure 50. Another rule is Phrases—Create auto-quoted phrases to help the user get to a specific set of results. Another rule is Redirect—Search terms can be intercepted, and users re-directed to appropriate pages (e.g. specific types of records) searched in the master and variant differentiated data structure 50. For example, a search for "shipping" will redirect the user to the shipping details page, as opposed to a results page for products with the word "shipping" such as shipping labels. Another rule is Spelling—Intercept a user's search by overriding specific words that don't come out of the box with the search engine 24. Another rule is Synonyms—Search terms can be expanded by adding one-way synonyms, or two-way synonyms. One-Way Synonym: In this query, a search for computers will expand to laptops, which will inhibit results for computers surfacing when a user searches for laptops. Two-Way Synonym: In this query rewrite, a search for "PS3" would get expanded to "PlayStation 3" and vice versa.

Further rules 25,26 can be an Autobucket rule set used by the product service 14 to allow it to automatically create and manage refinement value ranges from data feeds (e.g. product information 22). Autobucket rule set when triggered processes the full set of data 22 to figure out how the numeric data should be bucketed. Autobucket can scan the input data 22 and determine what buckets should be created for the numeric fields to be included in the content of the response query 20. For example, if you have price data that ranges from $1.00 to $10,000.00, Autobucket can create a number of buckets from $0-$10,000. The number and granularity of the buckets can depend on the distribution of the price data in the product information 22. For example, if the price data is most dense in the range 0-100, more buckets can be created in that range and fewer higher up the range as configured by the Autobucket rule set definitions/rules.

Further rules 25,26 can be an Autonav rule set used by the product service 14 to determine what refinements to display (on user interface 104) at which points in the user experience. The system can learn what to show based on a specified refinement. This refinement can be referred to as the keystone navigation. For example, if you have a property called Category_level_1 on your records 32, autonav can identify this is the 'keystone' value. Autonav rule set can configure the product service 14 to scan through all the records 32 in the incoming data directory and figure out what dynamic navigation should show up for each of the values in Category_level_1. As such, the product service 14 can support dynamic navigation which can helps users refine products displayed on the user interface 104 through intelligent (as dictated by the Autonav rule set) and automated filtering.

Figure 6:
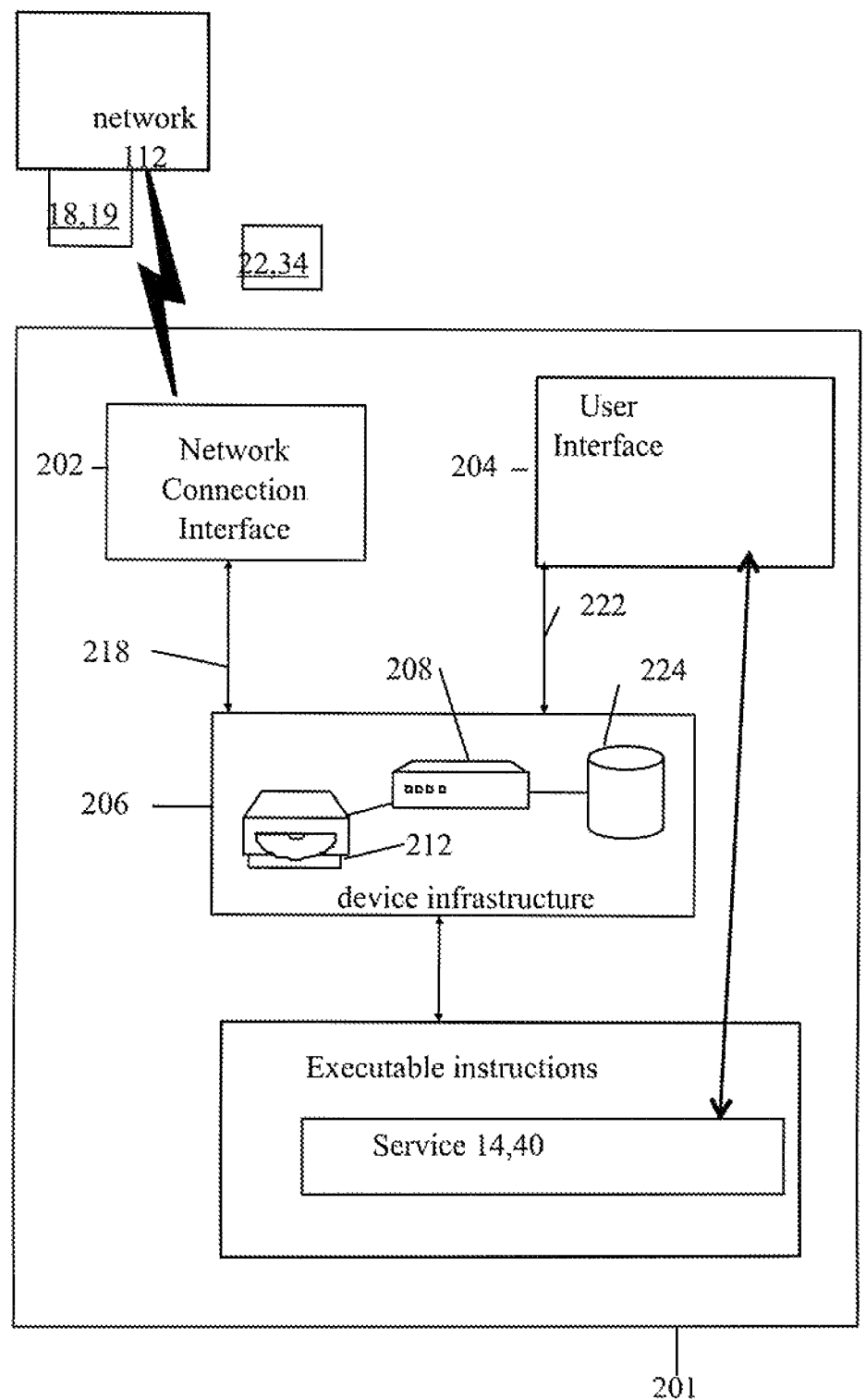
FIG. 6 is an example configuration of a network server of the system of FIG. 1.
Figure 7:
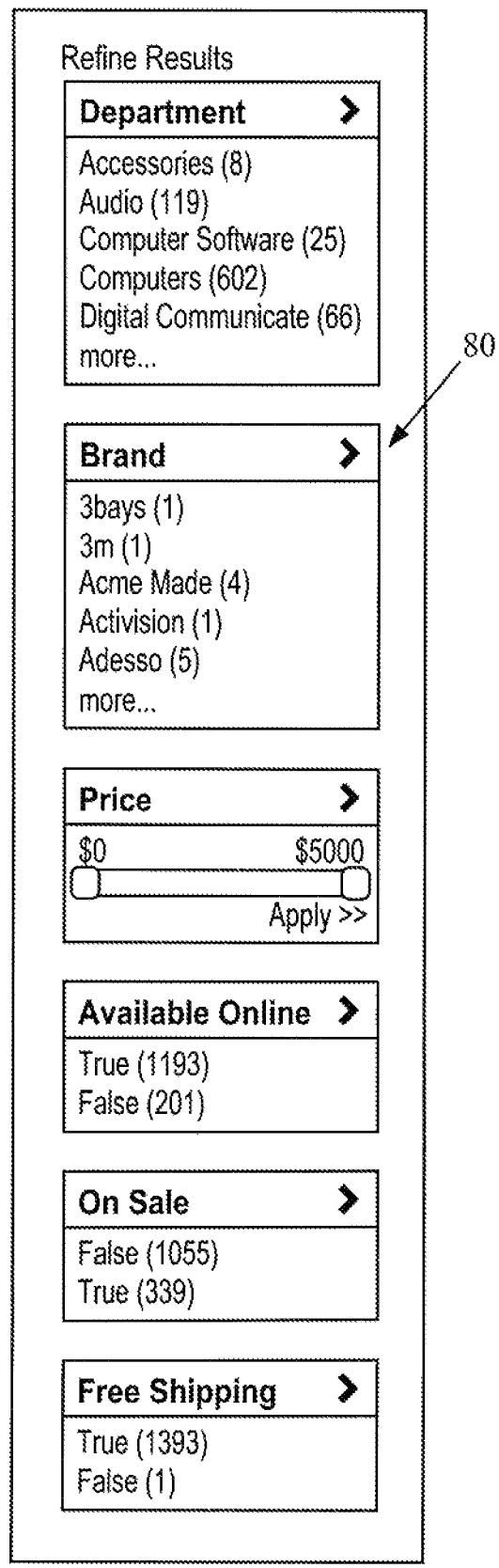
FIG. 7 shows an example configuration of a query result for navigation of the system of FIG. 1.

Referring to FIG. 6, the following is an example of what dynamic navigation looks like to a website user. The refinements 80 can be Brand, Department, Price and On Sale. Each refinement 80 has a set of refinement values defined in the rules 25,26 that users can select to further refine the search results 20 from searching the master and variant differentiated data structure 50, as implemented by the product service 14 in comparison of the selected refinements 80 of the query 18 (e.g. navigation query). For example, the Department refinement 80 has refinement values of Accessories, Appliance, Auto, etc.

Further rules 25,26 can be for the specification of one numeric product attribute (e.g. price, average rating) to make sortable. The search engine 24 can sort on relevancy and date, as well as any of the specified record types (e.g. master, variant, unique) in the master and variant differentiated data structure 50. Behind the scenes, the product service 14 is using the specified numeric field as a date so the search engine 24 can sort on it. The end result is that websites 50 can sort on relevancy or one numeric product. Using this method/rule set can have performance implications as it can instruct the bridge to fire two queries. Typically, this feature can be used when you have a large number of navigation items that will overwhelm the end user, as it works by using one of the existing navigation items to decide what the query 18 is about and fires a second query 18 to the search engine 24 to restrict the navigation to the most relevant set of navigation items for this search term. For example, if you pass in query.setSearchString("paper") Query.setRestrictNavigation("2:category"), the product service 14 will find the category navigation refinements in the first query 18 and fire the second query 18 for the top 2 most populous categories. Therefore, a search for something generic like "paper" can bring back top category matches like copy paper (1,030), paper pads (567). The product service 14 can fire off the second query 18 with the search term, plus an OR refinement with the most likely categories. The navigation items in the first query 18 can be entirely replaced with the navigation items in the second query 18 by the product service 14. As such, the first parameter can specifies how many categories should be used in the navigation restriction in the second query 18.

As such, it is recognised that the product service 14 can modify the received query 18 (e.g. search query, navigation query, etc.) in a number of different ways. For example, when the query 18 comes in, the product service 18 looks at it, and if an area of the query content is specified in the rules 25 (e.g. in comparison of the query content with the rules of the rule set 25), then the product service modifies the query 18 content as the modified query 19 to use a specific front end (e.g. set of configuration data 38 and associated interpretation and implementation of the modified query 19 against the product index of the records 32 stored in the storage 30) that is created by the configuration data 38 upload provided to the search engine 24.

Another example is biasing, such that when the query 18 comes in, the product service 14 looks for any biasing profile name(s) in the query 18 content, in comparison of with the rules 25 for matching biasing name words or phrases, and then modifies the query 18 content (as defined by the rules 25) to match the name of the biasing profile defined in the search engine 24 by the configuration data 38 upload. In other words, the biasing related text (e.g. words, phrases) submitted by the user in the query 18 content may not match the specific biasing text labels/names recognised by the search engine 24 via its configuration data 38 (e.g. biasing names/labels associated with specific actions specifying application or return results of the modified query 19 content). Another example is Product Data, such that example data files (e.g. records 32) represented in the product index of the storage 30 can be Comma Separated Value (CSV) files, Google Commerce Search (GCS) files, etc. The files 32 can be grouped into a flat directory and a product data processing tool (as hosted by the administration service 40) can process the files by using the file templates. For example, the template file (e.g. configuration data 38) can be used by the data processing tool to format the (e.g. HTML) body of the product description that is sent along with each product record to the search engine 24 to be incorporated as part of the product index in the storage 30. The template file 38 can be used to format what the product detail page would look like to the search engine 24 and thereby assist in constructing the product index by the search engine 24 as well as helping the search engine 24 with relevancy of the individual template processed records 32 when evaluating them against the contents of the modified query 19. The template files 38 can include template (defaultTemplate.vm) to reflect the attribute (e.g. master/variant data differentiation as well as title and description data) in the product information 22 represented in the product index.

A further example is another method performed by the product service 14 (as expressed in the rule set 25) to instruct the product service 14 to fire multiple queries 19 based on the original query 18,19 content (i.e. in response to comparison of the query 18,19 content to the rules of the rule set 25). This method can be used by the product service 14 when the product service 14 determines that the query response 20 could have a large number (e.g. over a specified navigation threshold in the rules 25) of navigation items that could overwhelm the end user. The generation of the multiple queries 19 works by using one of the existing navigation items of the query 18,19 to decide what the query 18,19 is about and fires a second/subsequent query 19 to restrict the navigation to the most relevant set of navigation items for this search term. For example, if the query 18,19 contains query.setSearchString("paper")query.setRestrictNavigation ("2:category"), the product service 14 can find the category navigation refinements in the first query 18 and fire a second query 19 for the top (e.g. 2) most populous categories. Therefore, a query 18,19 search for something generic like "paper" could bring back top category matches like copy paper (1,030), paper pads (567). The product service 14 would fire off the second query 19 to the search engine 24 with the search term, plus an OR refinement with the most likely categories. The navigation items in the first query 18,19 could be entirely replaced with the navigation items in the second query 19. It is also recognised that the first parameter of the query 18,19 could specify how many categories could be used in the navigation restriction in the second query 19. As such, the product service 14 can be implemented as a component of the server 201 that is a threaded, REST service that serves all the API queries 18 submitted to the product service 14 by the network device 12.

Referring to FIG. 2, shown is an example operation of the system 10 of FIG. 1. The product service 14 is configured for processing the query 18 on behalf of a user (e.g. user direct and/or indirect via an ecommerce website) requesting product information 22 via computer processor implemented instructions of: receive 300 the query 18 from the user over the communications network 16, the query including a query term 17; compare 302 the query term 17 to the set of stored rules 25 to determine a matching rule, the set of stored rules 25 based on at least one of content or format of the product information 22 contained in the product index associated with the search engine 24 (e.g. the product index searchable by the search engine 24 using the query content 17); augment 304 the query term 17 using the matching rule to generate an augmented query 19 containing an augmented query term 17 based on the query term 17 (e.g. to reflect the master and variant differentiated data structure 50); send 306 the augmented query 19 to the search engine 24 for searching against the product index (having records 32); receive 308 the query result 23 from the search engine 24 containing the product information 22 in response to the augmented query 19; optionally filter or otherwise reformat the product information contained in the product records 32 to reflect any desired information deemed pertinent in the master and variant differentiated data structure 50; and send 310 the product information 22 over the communications network 16 to the user for subsequent presentation on a user interface of the user, the product information 22 formatted as a response 20 to the query 18. It is recognised that the query 18 can be received from an ecommerce web site (expressed by network device 12) in communication with the user (not shown). In some cases, the product service 14 can generate a plurality of augmented queries 19,21 based on the query 18, each of the plurality of augmented queries 19,21 containing a respective augmented query term 17.

In terms of usage of the rule set 25, the product service 14 can be configured to generate each of the augmented queries based on a respective matching rule determined from the set of stored rules 25 representative of the master and variant differentiated data structure 50, each of the respective matching rules matching the query term 17. For example, the query 18 content can have one query term 17 that matches one rule of the rule set 25. Alternatively, the query 18 content can have one query term 17 that matches multiple rules of the rule set 25. Alternatively, the query 18 content can have multiple query terms 17 that each respectively match one or more rules of the rule set 25 (e.g. are associated with a particular type of record 32 such as but not limited to master, variant or unique). It is also recognised that one or more of the query terms 17 can remain unmatched against the rules of the rule set 25 (e.g. a query term 17 may not result in augmentation of the query 18 as a result of the presence of the unmatching query term 17 in the query 18.

Specific examples, as an illustration only, are where the query 18 contains a plurality of the query terms 17 and at least two of the respective matching rules match different query terms 17 from the plurality of query terms 17. Further, the query 18 can be a search query containing a search string as the query term 17. Further, the query 18 can be a navigation query such that the query term 17 represents a navigation state.

Figure 3:
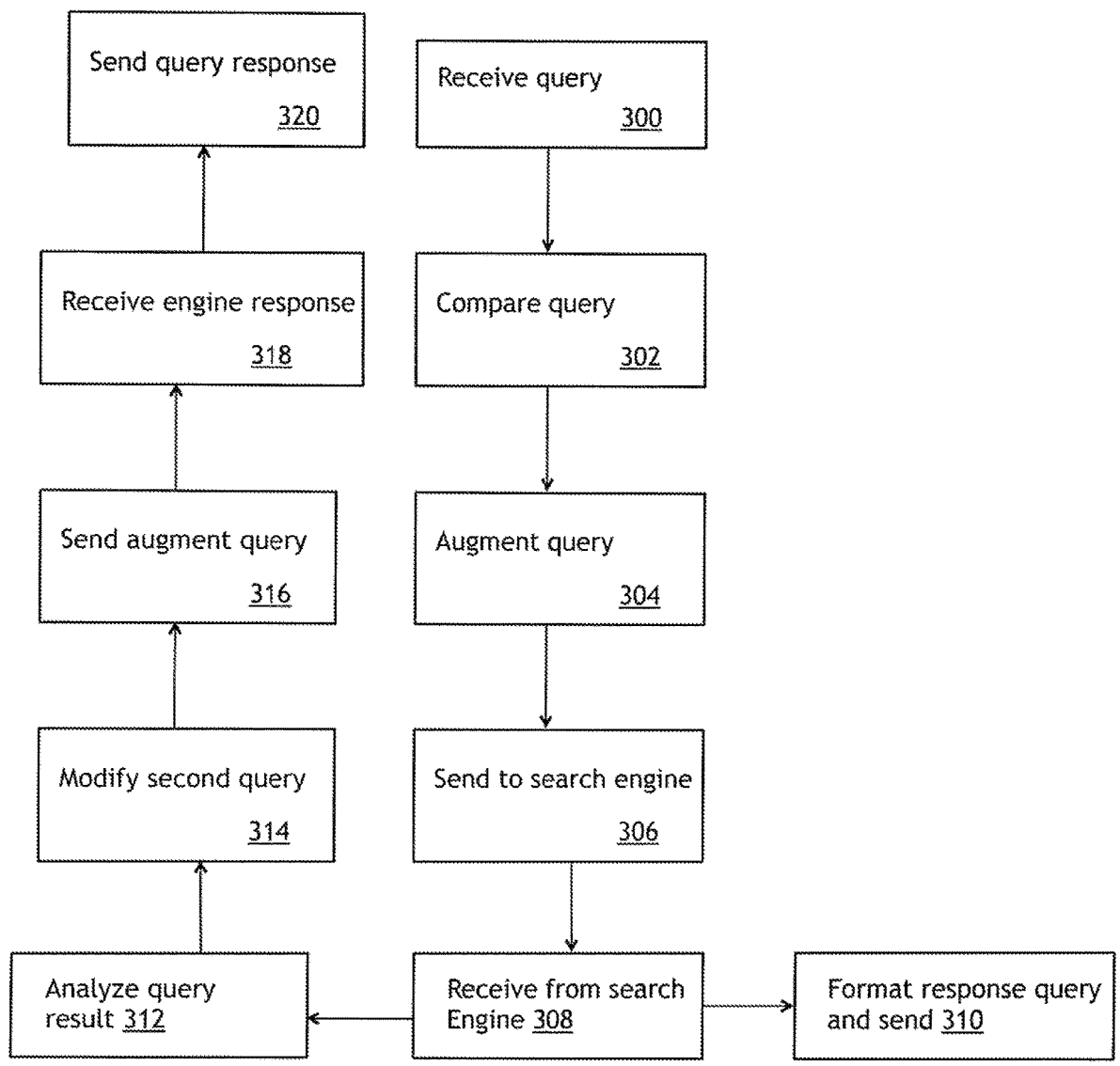
FIG. 3 shows an operational example of the system of FIG. 1.

Referring again to FIG. 3, the product service 14 can optionally analyze 312 the query result 23 using the set of stored rules 25 reflecting the master and variant differentiated data structure 50 to determine a second matching rule by comparing the query result 23 to the set of stored rules; modify 314 at least one of the query 18 or the augmented query 19 to generate a second augmented query 21 based on the second matching rule; send 316 the second augmented query 21 to the search engine 24 to search the master and variant differentiated data structure 50 based on the changed query content reflecting the master and variant differentiated data structure 50; receive 318 a second query result 23 from the search engine 24 containing modified product information 22 in response to the second augmented query 21; and send 320 the modified product information 22 as the response 20 rather than the product information 22, the modified product information 22 formatted as the response 20 to the query 18.

As discussed above, the product service 14 and associated rules 25 can be aware (e.g. via specified rule definitions, rule functionality, etc.) of and act on (e.g. when related content of the query 18 is associated thereto by the rule definitions) that the product index (records 32) contains the product information 22 formatted using a predefined set of metadata tags for use by the search engine 24 of for the master and variant differentiated data structure 50 in searching the product index with the augmented query term 17, the predefined set of metadata tags referenced in the set of stored rules 25,26. For example, the product service 14 could identify/label in the augmented query 19,21 certain query terms 17 as product titles and/or query terms 17 as representative of product definitions for particular records 32 in the master and variant differentiated data structure 50, when such respective query terms 17 match one or more of the rules of the rule set 25. For example, the query term 17 of "Polo shirt" (in the query 18) could match a title rule 25 (i.e. unique record 32) and therefore the product service 14 could modify the query term 17 "Polo shirt" as defined as a title in the augmented query 19 received by the search engine 24 to be limited to the specific unique record type in the master and variant differentiated data structure 50. As such, the search engine 24 would know via its configuration data 38 (e.g. product content metadata templates) that only title records 32 (e.g. tagged with a title tag) should be searched using the augmented term 17 "title: Polo shirt" and description records 32 (e.g. tagged with a body tag) would not be searched using the augmented term "title: Polo shirt" in the master and variant differentiated data structure 50.

For example, the query term 17 of "Crimson shirt" (in the query 18) could match a product description (e.g. body text) rule 25 and therefore the product service 14 could modify the query term 17 "Crimson shirt" as defined as a body text in the augmented query 19 received by the search engine 24. As such, the search engine 24 would know via its configuration data 38 (e.g. product content metadata templates) that only body records 32 (e.g. tagged with a body tag) should be searched using the augmented term 17 "body: Crimson shirt" and title records 32 (e.g. tagged with a title tag) would not be searched using the augmented term "body: Crimson shirt". This labelling of the query terms 17 by the product service 14 can be used to disregard search results of non-brand name (e.g. non-unique product records 32) Polo shirts (e.g. those only having "polo" in the body description and/or disregarding those shirts having a brand name of "Crimson" that may not have a colour of crimson. In this manner, knowledge in the rules 25 of content and/or formatting of the product information 22 in the product index can be used by the product service 14 to customize the search results 20 on behalf of the user and thus facilitate the generation of more relevant search results 20 to the user (e.g. returning brand name unique records 32 polo shirts rather than polo-like shirts and/or returning brand name unique records 32 "Crimson" shirts that may not be coloured crimson as desired by the user). An example of usage of the title/body augmentation of the search terms 17 could be during navigation, in which the user has already selected non-brand name crimson coloured shirts (e.g. associated with variant records 32) and then during subsequent navigation expects only crimson coloured shirts to be presented on the user interface (not brand name Crimson shirts that may include colours other than crimson and are thus identified in the master and variant differentiated data structure 50 as unique records 32). An example of usage of the title/body augmentation of the search terms 17 could be during navigation, in which the user has already selected brand name polo shirts and then during subsequent navigation expects only brand name polo shirts to be presented on the user interface.

As discussed, the search engine 24 can be configured based on a Google Search appliance (GSA), Elastic search, or any other suitable search engine 24 configured to search a product index using query term(s) 17 and return a ranked listing (e.g. based on relevancy to the query term 17) of product information 22 from the product index records 32 matching the query term 17.

Further, the product service 14 can receive a second query 18 from the user over the communications network 16, the second query including a second query term 17; compare the second query term 17 to the set of stored rules 25 to determine a second matching rule; determine based on the second matching rule that the second query term 17 is unrelated to searching of the product information 22 in the product index records 32; retrieve content external to the product index for use in satisfying the second query 18 by redirecting the second query 18 away from the search engine 24 for use in searching the product index; and send the content as the product information 22 over the communications network 16 to the user for subsequent presentation on the user interface of the user, the content formatted as a second response 20 to the second query 18.

For example, the product service 14 can determine a category of the content (i.e. external to the product index) using the query term 17 in comparison with the rules 25, the category selected from the group consisting of: store location; payment information; operating hours; and contact information. The content (i.e. external to the product index) can be stored as static information matching the category for retrieval based on the query term 17 associated with the content (e.g. the user searches for store location and information with map details and driving directions is returned as the content). Alternatively, the content is generated as dynamic information matching the category for retrieval based on the query term 17 determined as associated with the content (e.g. the product service 14 could generate real time results for driving directions based on current user geo location).

Further to the above, the set of stored rules 25 can optionally include a rule to dynamically change ranking relevance of individual product listings in the product information 22 received from the search engine. Also, for received search results 23, the product service 14 can use the rules 25 to dynamically change the ranking relevance of two or more of the individual product listings with respect to one another according to a relevance rule selected from the group consisting of: biasing of one product type over another; overriding result order of the individual product listings; changing how navigation of the individual product listings are ordered and displayed. These dynamic changes are implemented based on whether certain rules of the rule set 25 are triggered (or not) when the search results 23 are compared to the rule set 23 by the product service 14 to account for the master and variant differentiated data structure 50. For example, each of the product listings and/or a group of the product listings of the search results 23 can be compared on a rule by rule basis of the rules contained in the rule set 25. Those product listing(s) matching one or more of the rules provide instructions for the product service 14 in order to implement the functionality expressed by the matching rule(s).

Also, changes to the query term(s) 17 (in order to produce the augmented query 19,21) can be implemented based on whether certain rules of the rule set 25 are triggered (or not) when the query 18 is compared to the rule set 23 by the product service 14. For example, each of the query term 17 of the query 18 can be compared on a rule by rule basis of the rules contained in the rule set 25. Those query term 17 matching one or more of the rules provide instructions for the product service 14 in order to implement the functionality expressed by the matching rule(s) to generate the augmented query term(s) 17. One example of generating augmented query term(s) 17 is, prior to implementation of a native spell correction on the query term 17 by the search engine 24, the product service 14 via the rule set 25 implements augmentation of the query term 17 (e.g. from the query 18 and/or from the query 19 in the case of generating a subsequent augmented query 21) by identifying a misspelling of the query term 17 through comparing the query term 17 with a database (expressed in the rule set 25) of accepted spellings of one or more words predefined in the product information of the product index; correct the misspelling of the query term 17 based on the set of stored rules 25 by replacing the query term 17 with an accepted spelling to generate the augmented query 19,21 containing the augmented query term 17.

A further example is, prior to implementation of a native thesaurus correction on the query term 17 by the search engine 24, the product service 14 implements augmentation of the query term 17 by identifying a thesaurus correction of the query term 17 through comparing the query term 17 with a database of accepted thesaurus corrections (expressed by the rule set 25) of one or more words predefined in the product information of the product index; and include the thesaurus correction of the query term 17 based on the set of stored rules 25 to generate the augmented query term 17.

A further example is, prior to implementation of a native thesaurus correction on the query term 17 by the search engine 24, the product service 14 implements augmentation wherein the thesaurus correction includes using an EXPAND command to determine whether the query term 17 is appropriate as a search term for use by the search engine 24. For example, the thesaurus correction of the query term 17 as performed by the product service 14 can include the creation of both a one-way and a two-way thesaurus entry where the native thesaurus correction of the search engine 24 only supports one of the one-way or the two-way thesaurus entry methods.

A further example is, once the user submits query term 17 containing a plurality of words, the product service 14 can match the string of words to a rule in the rule set 25 that specifies entered quotations as summated automatically around the plurality of words (e.g. at the beginning and at the end) on the users behalf, as the augmented query term 17 included in the augmented query 19, 21. Alternatively, the product service 14, based on matching rule(s) to the query term 17, can augment the query term 17 with augmented data in the augmented query 19,21 that supports phrase matching by instructing the search engine 24 to only bring back pages (e.g. records 32 of the product index) that include these search terms 17 exactly as presented (e.g. typed) in-order, proximity, etc.

As an example, the phrase (query term 17) entered into the search engine 24 (via query 18) (e.g. 2013 academy award nominees) might bring back records 32 that have all the words you entered, but those words most likely will not be in the order you intended or even anywhere near each other. The product service 14, on the users behalf based on matching rule(s) with the query term 17, applies quotation marks around your phrases (e.g. "2013 academy award nominees") to submit as augmented query 19,21. When quotation marks are provided around a phrase, this instructs the search engine 24 to only bring back pages (i.e. product information 22) that includes these search terms exactly how typed them in-order, proximity, etc. The search results 23 now returned by the search engine 24 can only bring back product information 22 that has all these words in the exact order, proximity, etc. as represented in the inserted brackets by the product service 14. As for all other augmented queries 19,2, the insertion of brackets is based on the string of words matching a rule or rules of the rule set 25, which also provides direction to the product service 14 to insert brackets accordingly for the matching word set of the query term 17.

It is recognised that the product information 22 can include at least one of a master product record 32 or a variant product record 32 resident in the product index, as retrieved by the search engine 24 in response to the query 18,19,21 provided to the search engine 24 by the product service 14 on behalf of the network device 12.

An alternative operation of the product service 14 is where, in response to receiving the query 18, the product service 14 generates an A/B including two variants, A and B, as the plurality of augmented queries 19,21 based on the query 18 using one or more rules of the rule set 25 matching the query term 17 of the query 18; receive an A query result in the query result 23 from the search engine 24 containing the product information 22 in response to the augmented query 19,21 of the A variant; receive a B query result in the query result 23 from the search engine 24 containing the product information 22 in response to the augmented query 19,21 of the B variant; and decide based on the set of stored rules 25 which of the A query result or the B query result should be used as the product information 22 returned in the query result 20.

It is recognised that creation of an A/B by the product service 14 refers to A/B testing defined in web development, online marketing, and other forms of advertising to describe randomized experiments with two query variants, A and B, which are the control and treatment in the controlled experiment. The formal or scientific name used for this process of A/B query and other related processes can be referred to as hypothesis testing. Other names for the A/B query can include randomized controlled experiments, online controlled experiments, and split testing as applied to the generation of augmented queries 19,21 by the present innovative system 10. In online settings, such as augmented queries 19,21, the goal is to identify changes to queries 18,19 that increase or maximize an outcome of interest (e.g. deemed more appropriate/suitable query response 20 content) test between a set of rules 25 of the A/B to determine which produces a more desired query result 20.

Figure 4:
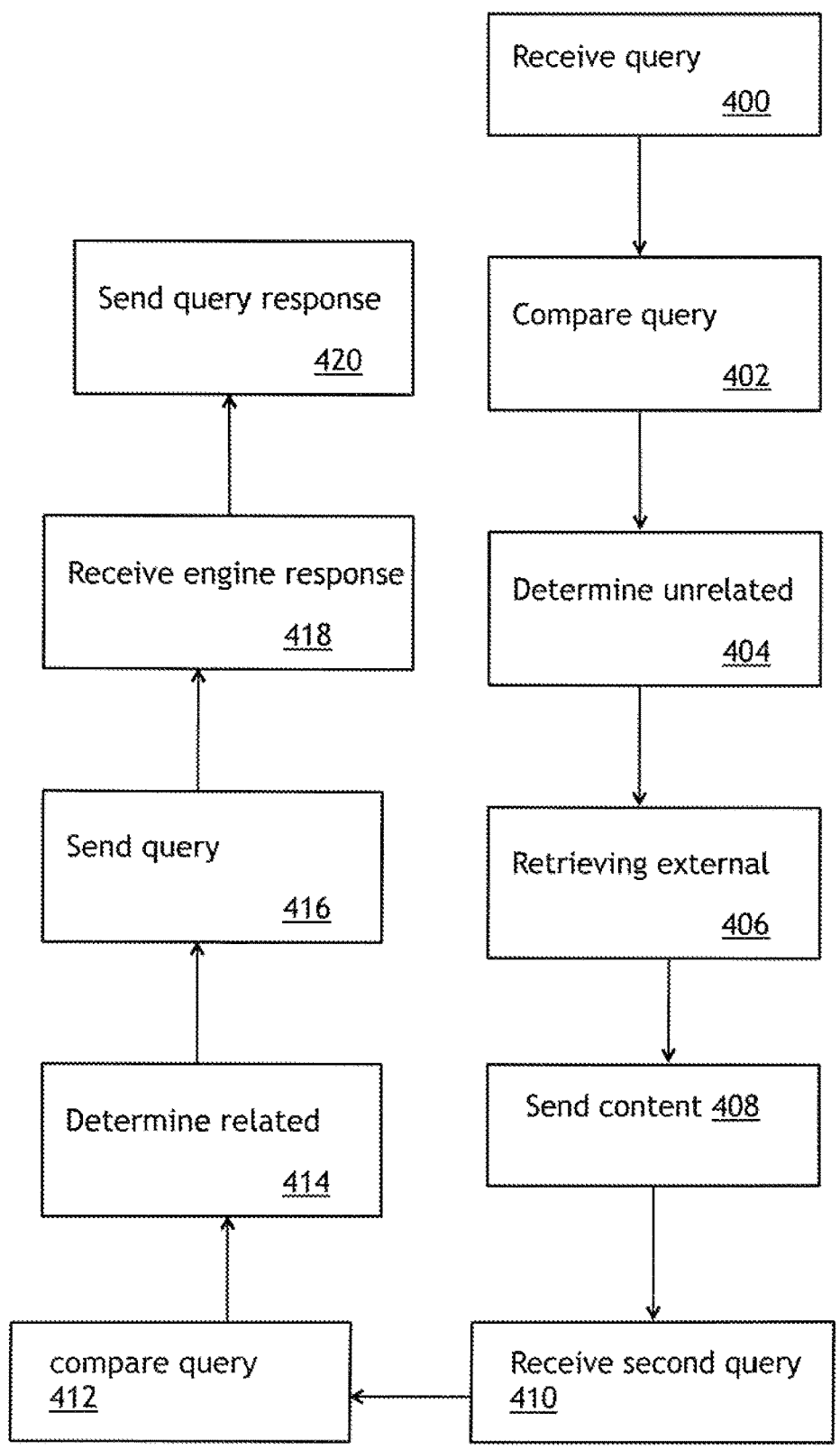
FIG. 4 shows a further operational example of the system of FIG. 1.

Referring to FIG. 4, shown is an alternative operational embodiment of the system 10, for example using redirect as focus. The example method is for processing the query 18 by the product service 14 on behalf of a user (e.g. network device 12) requesting product information 22 as stored instructions implemented by a computer processor, the method comprising: receiving 400 the query 18 from the user (e.g. end user, merchant website, etc.) over the communications network 16, the query 18 including the query term 17; comparing 402 the query term 17 to the set of stored rules 25 to determine a matching rule, the set of stored rules 25 based on at least one of content or format of the product information 22 contained in a product index associated with a search engine 24; determining 404 based on the matching rule that the query term 17 is unrelated to searching of the product information 22 in the product index; retrieving 406 content external to the product index for use in satisfying the query 18 by redirecting the query 18 away from the search engine 24 for use in searching the product index; and sending 408 the external content as the product information 22 over the communications network 16 to the user for subsequent presentation on a user interface of the user, the content formatted as a response 20 to the query 18. It is recognised that optionally determining a category of the content using the query term 17 can be performed by the product service 14, the category selected from the group consisting of: store location; payment information; operating hours; and/or contact information. The external content can be stored as static information matching the category for retrieval based on the query term 17 as the query 18 content. The external content can be generated as dynamic information matching the category for retrieval based on the query term 17 as the query 18 content. Further operations can include: receiving 410 a second query 18 from the user over the communications network 16, the second query 18 including a second query term 17; comparing 412 the second query term 17 to the set of stored rules 25 to determine a second matching rule; determining 414 based on the second matching rule that the second query term 17 is related to searching of the product information 22 in the product index rather than to the external content unrelated to the product index; sending 416 the second query term 17 (potentially modified) to the search engine 24 for searching against the product index; receiving 418 a query result 23 from the search engine 23 containing the product information 22 in response to the second query term 17; and sending 420 the product information 22 over the communications network 16 to the user for subsequent presentation on the user interface of the user, the product information 22 formatted as a second response 20 to the second query 18.

Further, the operation of the product service 14 can include: receiving a second query 18 from the user over the communications network 16, the second query 18 including a second query term 17; comparing the second query term 17 to the set of stored rules 25 to determine a second matching rule; augmenting the second query term 17 using the second matching rule to generate an augmented query 19 containing an augmented query term 17 based on the second query term 17; sending the augmented query term 17 to the search engine 24 for searching against the product index; receiving a query result 23 from the search engine 24 containing the product information 22 in response to the augmented second query term 17; and sending the product information 22 over the communications network 16 to the user for subsequent presentation on the user interface of the user, the product information 22 formatted as a second response 20 to the second query 18.

It is recognised that the product service 14 can determine using the set of stored rules a selected template defining page layout of the product information; and notify a website (e.g network device 12 hosted) requesting the query 18 of the template.

The ecommerce enabled system 10 uses the communications network 16 to facilitate communication between the network devices 12 (hosting a query enabled client application 200 such as a web browser), the product service 14, the search engine 24, the administration service 40 and/or storage 30. Preferably, the communications network 16 can be a wide area network such as the Internet, however the network 16 may also comprise one or more local area networks 16. Further, the network 16 need not be a land-based network, but instead may comprise a wireless network and/or a hybrid of a land-based network and a wireless network for enhanced communications flexibility. One example is where the communications network 16 includes a local area network 16 segment (e.g. wired, wireless, etc. on which the network device 12 is registered, communicates on) and a wide area network 16 segment (e.g. the Internet on which the product service 14 is addressed) to which the local area network 16 is connected to. It is also recognised that the product service 14 and the search engine 24 can be coupled via a network 16 when on different machines 201 (e.g. a local or wide area network 16 as desired).

Each network device 12 typically comprises a land-based network-enabled personal computer. However, the invention is not limited for use with personal computers. For instance, one or more of the network devices 12 can comprise a wireless communications device, such as a wireless-enabled personal data assistant, a tablet, or e-mail-enabled mobile telephone if the network 16 is configured to facilitate wireless data communication. The network device 12 is capable of supplying geographical location information of itself to the system 10 in the communication 18 to request product details of the storage 30 as facilitated via interaction between the product service 14 and the search engine 24. The user of the network device 12 can provide its geographical coordinates through any suitable mechanism known to those skilled in the art, including latitude/longitude co-ordinates, GPS, and wireless triangulation. Other methods of obtaining geographical coordinates may also includes Wi-Fi based services. Further, the location information can be in the form of geographical coordinate data, such as, for example, Global Positioning System ("GPS") coordinate data specifying latitude, longitude and elevation. In some embodiments, the location information may comprise the GPS satellite network and the location information via a GPS transceiver for obtaining GPS coordinate data.

Figure 5:
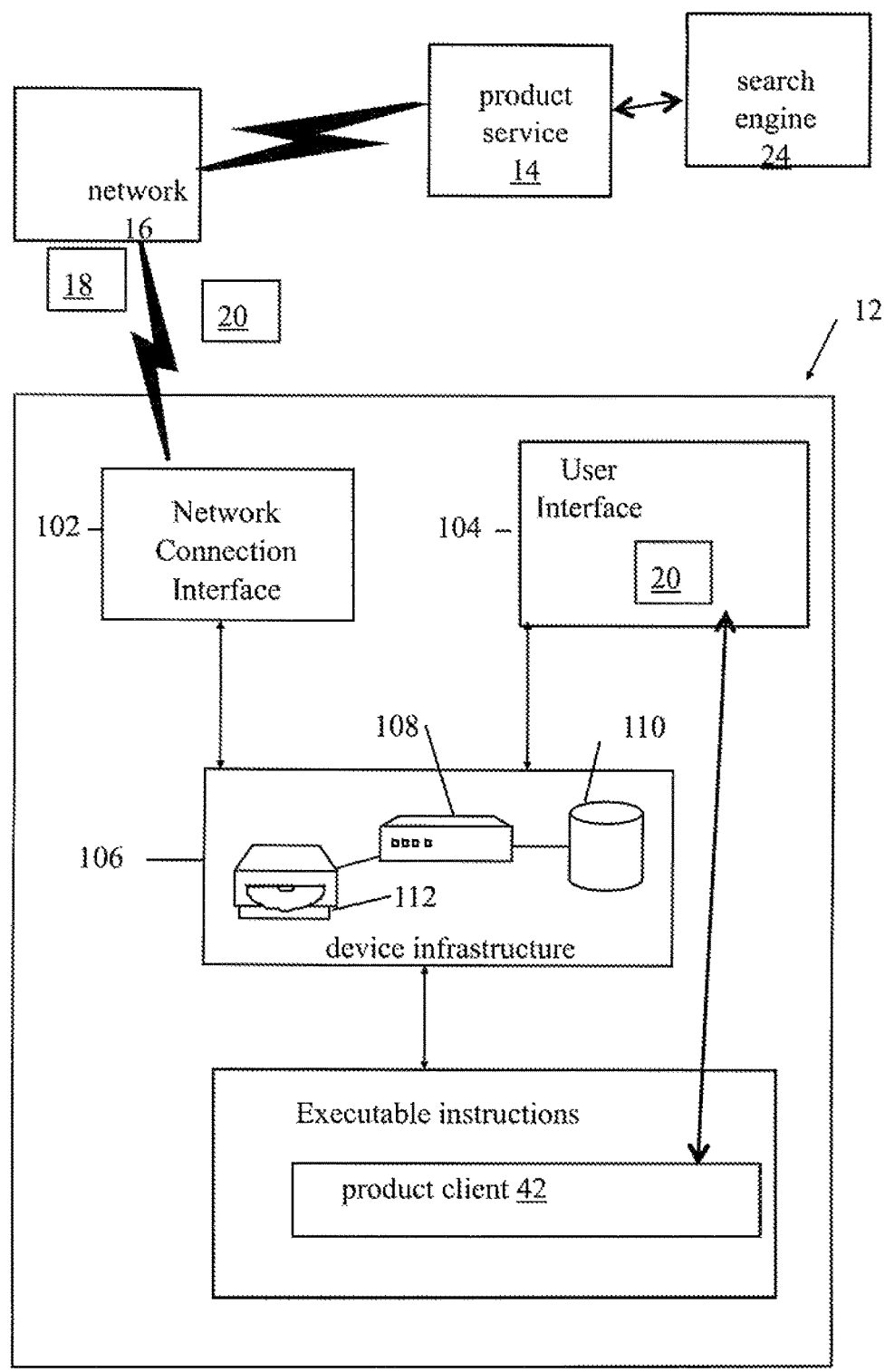
FIG. 5 is an example configuration of a network device of the system of FIG. 1.

As shown in FIG. 5, the network device 12 comprises a network interface 102, the user interface 104, and a data processing system 106 in communication with the network interface 102 and the user interface 104. Typically, the network interface 102 comprises an Ethernet network circuit card, however the network interface 102 may also comprise an RF antenna for wireless communication over the communications network 16. Preferably, the user interface 104 comprises a data entry device (such as keyboard, microphone or writing tablet), and a display device (such as a CRT or LCD display). The data processing system 106 includes a central processing unit (CPU) 108, and a non-volatile memory storage device (DISC) 110 (such as a magnetic disc memory or electronic memory) and a read/write memory (RAM) 112 both in communication with the CPU 108. The DISC 110 includes data which, when loaded into the RAM 112, comprise processor instructions for the CPU 108 which define memory objects for allowing the network device 12 to communicate with the product service 14 over the communications network 16.

In view of the above descriptions of storage 30 (and other local device storage used to store the rules 25,26 and/or configuration data 38), the storage 30 can be configured as keeping the stored data (e.g. records 32) in order and the principal (or only) operations on the stored data are the addition of and removal of the stored data from the storage (e.g. FIFO, FIAO, etc.). For example, the storage can be a linear data structure for containing and subsequent accessing of the stored data and/or can be a non-linear data structure for containing and subsequent accessing of the stored data. Further, the storage receives various entities such as data that are stored and held to be processed later. In these contexts, the storage can perform the function of a buffer, which is a region of memory used to temporarily hold data while it is being moved from one place to another (i.e. between the services 14,40,24 and/or towards the network device 12). Typically, the data is stored in the memory when moving the data between processes within/between one or more computers. It is recognised that the storage can be implemented in hardware, software, or a combination thereof. The storage is used in the network system 10 when there is a difference between the rate/time at which data is received and the rate/time at which the data can be processed.

Further, it will be understood by a person skilled in the art that the memory/storage described herein is the place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage can also be defined as an electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the server 201 as host for the product service 14, search engine 24 and/or administration service 40 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 16. The server(s) 201 can provide specialized services across the network 16, for example to private users inside a large organization or to public users via the Internet 16. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 16 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Referring to FIG. 6, a computing device 201 of the service 14,40 can include a network connection interface 202, such as a network interface card or a modem, coupled via connection 218 to a device infrastructure 206. The connection interface 202 is connectable during operation of the devices to the network 16 (e.g. an intranet and/or an extranet such as the Internet), which enables the devices to communicate with each other (e.g. that of servers 201 with respect to one another and the devices 12) as appropriate. The network 16 can support the communications 18,19,20,22,34, and the related content.

Referring again to FIG. 6, the device 201 can also have a user interface 204, coupled to the device infrastructure 206 by connection 222, to interact with a user (e.g. server administrator—not shown). The user interface 204 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 206. Referring again to FIG. 5, operation of the device 201 is facilitated by the device infrastructure 206. The device infrastructure 206 includes one or more computer processors 208 and can include an associated memory (e.g. a random access memory 224). The computer processor 208 facilitates performance of the device 201 configured for the intended task (e.g. of the respective module(s) of the service 14,40) through operation of the network interface 202, the user interface 204 and other application programs/hardware of the device 201 by executing task related instructions. These task related instructions can be provided by an operating system, and/or software applications located in the memory, and/or by operability that is configured into the electronic/digital circuitry of the processor(s) 208 designed to perform the specific task(s). Further, it is recognized that the device infrastructure 206 can include a computer readable storage medium 212 coupled to the processor 208 for providing instructions to the processor 208 and/or to load/update the instructions. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard disk drive, solid-state memory card, or RAM provided in the memory module 212. It should be noted that the above listed example computer readable mediums 212 can be used either alone or in combination.

Further, it is recognized that the computing device 201 can include the executable applications comprising code or machine readable instructions for implementing predetermined functions/operations including those of an operating system and the service 14,40 modules, for example. The processor 208 as used herein is a configured device and/or set of machine-readable instructions for performing operations as described by example above. As used herein, the processor 208 may comprise any one or combination of, hardware, firmware, and/or software. The processor 208 acts upon information by manipulating, analyzing, modifying, converting or transmitting information for use by an executable procedure or an information device, and/or by routing the information with respect to an output device. The processor 208 may use or comprise the capabilities of a controller or microprocessor, for example. Accordingly, any of the functionality of the service 14,40 (e.g. modules) may be implemented in hardware, software or a combination of both. Accordingly, the use of a processor 208 as a device and/or as a set of machine-readable instructions is hereafter referred to generically as a processor/module for sake of simplicity. Further, it is recognised that the service 14,40 can include one or more of the computing devices 201 (comprising hardware and/or software) for implementing the modules, as desired. It will be understood in view of the above that the computing devices 201 of the service 14,40 can be, although depicted as a single computer system, may be implemented as a network of computer processors, as desired.

As such, the system 10 and implemented methods described above provide for an advantage of receiving a search string or navigation state from a commerce web site requesting content, wherein the system can intelligently interpret the string on the user behalf, using a set of rules, and can generating a set of queries, the set of queries can include one or more queries that are relevant to the searchable content of the product index (i.e. records 32 stored in the storage 30); wherein these methods also can optionally determine if a query against the search engine 24 is even required and can therefore redirect the user of the query 18 to other dynamic or static content stored outside the search index in the storage 30 accessible through the search engine 24. In other words, it is recognised that the product service 14 only has access to the product information 22 contained in the product index only via the search engine 24, and as such the product service relies on the search engine 24 to provide product information 22 suitable in response to at least some of the queries 18 received from the network device 12.

What is claimed is:

1. A system for processing a query request on behalf of a user requesting product information, the system comprising:
   a computer processor; and
   a memory storing instructions, which when executed by the computer processor configure the system to:
   intercept the query request from a network device associated with the user over a communications network, the query request including a query term for a desired product to search for in a product database;
   determine if the query should be directed to a search engine for searching the product database;
   when it is determined that the query should not be directed to the search engine, determine content to return in response to the query request;
   when it is determined that the query should, be directed to the search engine, generate an augmented query request by:
     accessing product definitions stored in a master and variant record differentiated product database containing the product information for a particular product;
     comparing the query term of the received query request to the product definitions accessed from the master and variant record differentiated product database to determine whether the query term matches one or more master definitions of the product database or one or more variant definitions of the product database;
     determining a record type to be searched within the master and variant record differentiated product database based on results of the matches, the record type comprising a master record type or a variant record type; and
     augmenting the received query request with augmented query content including an indication of the determined record type to be searched;
   send the augmented query request to the search engine for searching against the product database;
   receive a query result containing the product information, from the search engine, in response to the augmented query request; and
   send the product information over the communications network to the network device for subsequent presentation on a user interface of the user, the product information formatted as a response to the query request and including either:
     one or more representative images corresponding to one or more master records matching the augmented query, from the product database; or
     one or more representative images corresponding to one or more variant records matching the augmented query, from the product database.

2. The system of claim 1, wherein the product database contains product information for a plurality of different products, such that each of the plurality of products has a respective master record and a respective plurality of variant records.

3. The system of claim 1, wherein the query request is received from an ecommerce web site in communication with the user.

4. The system of claim 1, wherein the computer processor is further configured to augment content of the product information of the query result based on one or more rules, of a set of stored rules, associated with processing query results prior to sending the product information over the communications network to the user.

5. The system of claim 4, wherein the set of stored rules includes at least one rule to dynamically change ranking relevance of individual product listings in the product information received from the search engine.

6. The system of claim 1, wherein the query request is a search query containing a search string as the query term.

7. The system of claim 1, wherein the query request is a navigation query such that the query term represents a navigation state.

8. The system of claim 1, wherein when comparing the query term to the product definitions determines the query term matches a master definition, the augmented query content includes indication of the record type of master for instructing the search engine in performance of said searching.

9. The system of claim 1, wherein when comparing the query term to the product definitions determines the query term matches a variant definition, the augmented query content includes indication of the record type of variant for instructing the search engine in performance of said searching.

10. The system of claim 1, wherein the search engine is configured to:
    generate the query result containing the product information in response to the augmented query content by performing searching in accordance with the record type indicated in the augmented query content.

11. A non-transitory computer readable medium storing instructions, which when executed by a processor of a computer system configure the computer system to:
    intercept the query request from a network device associated with the user over a communications network, the query request including a query term for a desired product to search for in a product database;
    determine if the query should be directed to a search engine for searching the product database;
    when it is determined that the query should not be directed to the search engine, determine content to return in response to the query request;
    when it is determined that the query should be directed to the search engine, generate an augmented query request by:
      accessing product definitions stored in a master and variant record differentiated product database containing the product information for a particular product;

comparing the query term of the received query request to the product definitions accessed from the master and variant record differentiated product database to determine whether the query term matches one or more master definitions of the product database or one or more variant definitions of the product database;

determining a record type to be searched within the master and variant record differentiated product database based on results of the matches, the record type comprising a master record type or a variant record type; and augmenting the received query request with augmented query content including an indication of the determined record type to be searched;

send the augmented query request to the search engine for searching against the product database;

receive a query result containing the product information in response to the augmented query content; and send the product information over the communications network to the network device for subsequent presentation on a user interface of the user, the product information formatted as a response to the query request and including either:

one or more representative images corresponding to one or more master records matching the augmented query, from the product database; or one or more representative images corresponding to one or more variant records matching the augmented query, from the product database.

\* \* \* \* \*

UNITED STATES PATENT AND TRADEMARK OFFICE
CERTIFICATE OF CORRECTION

| | |
|---|---|
| PATENT NO. | : 11,170,425 B2 |
| APPLICATION NO. | : 14/639461 |
| DATED | : November 9, 2021 |
| INVENTOR(S) | : Will Warren and Roland Gossage |

It is certified that error appears in the above-identified patent and that said Letters Patent is hereby corrected as shown below:

On the Title Page

Item (73), delete "BCE Inc." and insert -- GroupBy Inc. --

Signed and Sealed this
Twenty-fourth Day of October, 2023

Katherine Kelly Vidal
*Director of the United States Patent and Trademark Office*